US008692795B1

(12) United States Patent
Kremin et al.

(10) Patent No.: US 8,692,795 B1
(45) Date of Patent: Apr. 8, 2014

(54) CONTACT IDENTIFICATION AND TRACKING ON A CAPACITANCE SENSING ARRAY

(75) Inventors: Victor Kremin, Lviv (UA); Volodymyr Hutnyk, Lviv (UA); Vasyl Mandziy, Shchyrec Vil. (UA)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 13/217,147

(22) Filed: Aug. 24, 2011

Related U.S. Application Data

(60) Provisional application No. 61/376,656, filed on Aug. 24, 2010.

(51) Int. Cl.
*G06F 3/045* (2006.01)
*G06F 3/042* (2006.01)

(52) U.S. Cl.
USPC .......................................... 345/174; 345/173

(58) Field of Classification Search
USPC .................................................. 345/173–178
See application file for complete search history.

(56) References Cited

U.S. PATENT DOCUMENTS

| | | | |
|---|---|---|---|
| 2008/0309629 A1* | 12/2008 | Westerman et al. | 345/173 |
| 2010/0259504 A1* | 10/2010 | Doi et al. | 345/174 |
| 2010/0321328 A1* | 12/2010 | Chang et al. | 345/174 |
| 2012/0013546 A1* | 1/2012 | Westhues et al. | 345/173 |

* cited by examiner

*Primary Examiner* — Alexander Eisen
*Assistant Examiner* — Amit Chatly

(57) ABSTRACT

A technique for providing reliable position calculations for conductive inputs at the edges of a touch-sensitive array is disclosed. A matrix of sensors is completed using virtual sensors or nodes, allowing for a closer approximation of position of a conductive object. The matrix may be defined by a center point or sensor and a number of surrounding nodes or sensors.

23 Claims, 25 Drawing Sheets

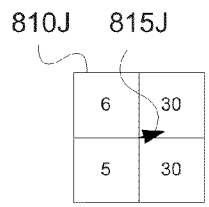
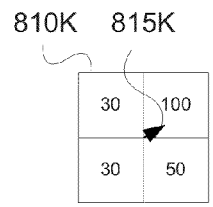
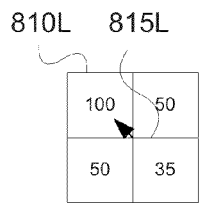
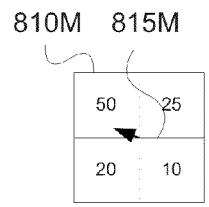
Figure 8J Figure 8K Figure 8L Figure 8M
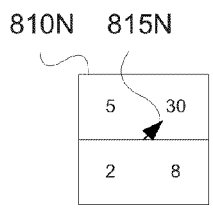
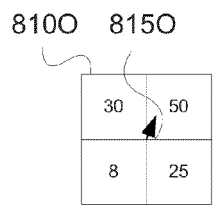
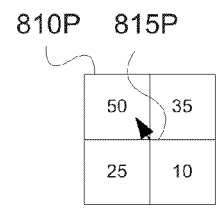
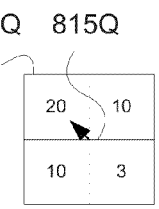
Figure 8N Figure 8O Figure 8P Figure 8Q
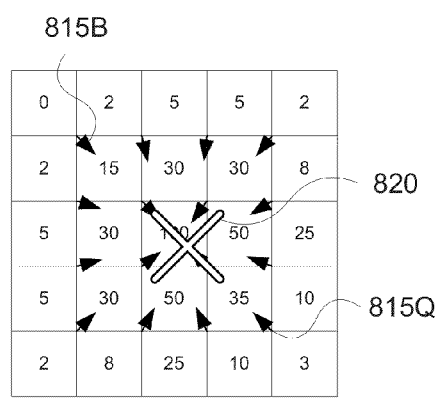
Figure 8R

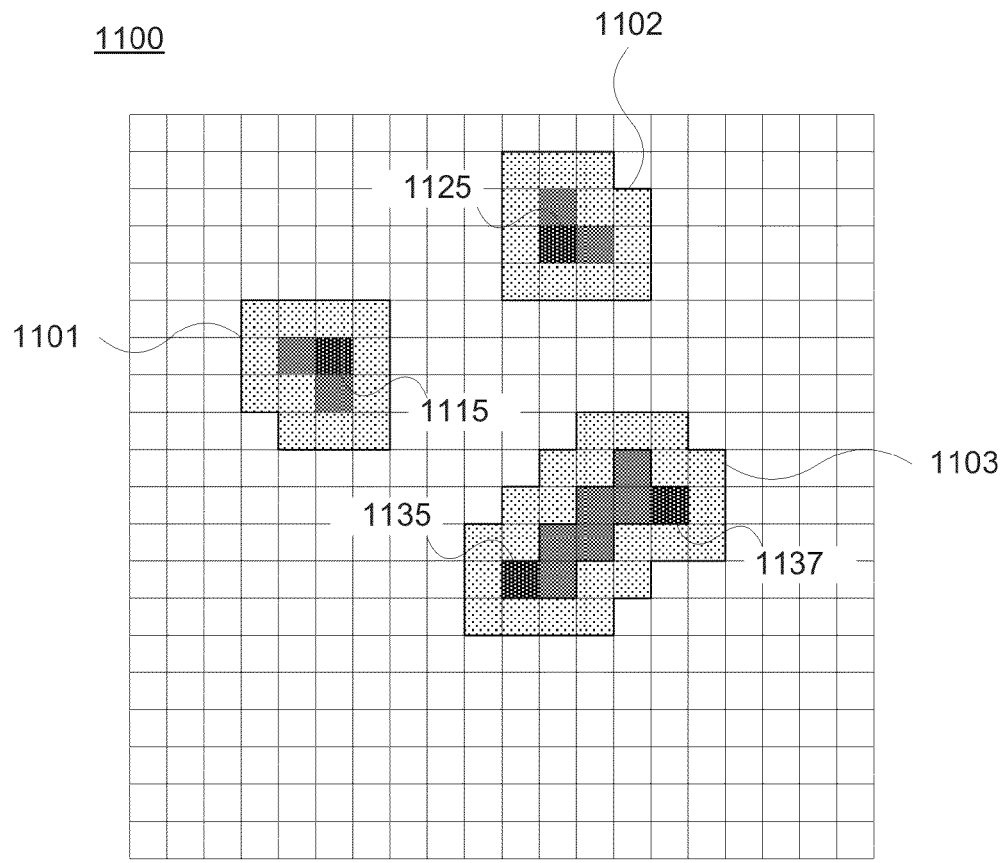
Figure 11A
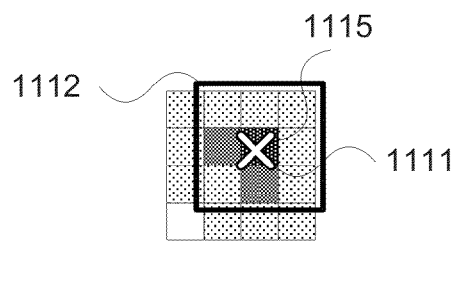 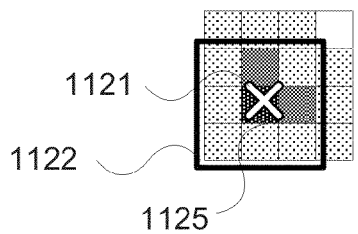
Figure 11B Figure 11C

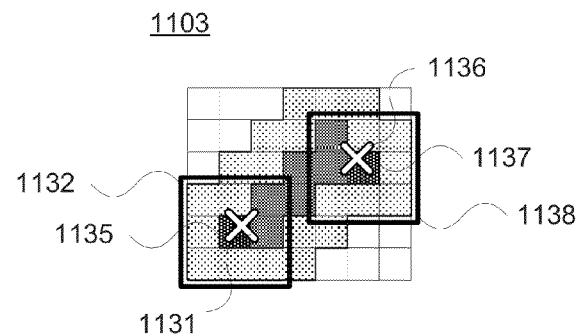
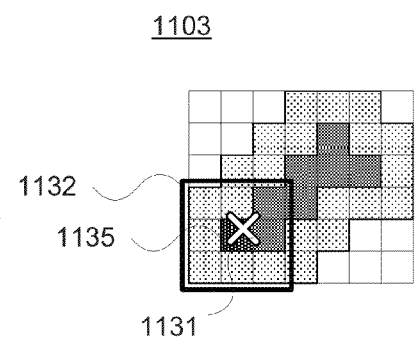
Figure 11D                    Figure 11E
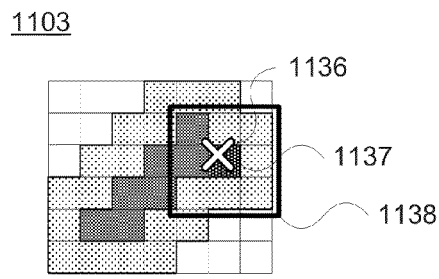
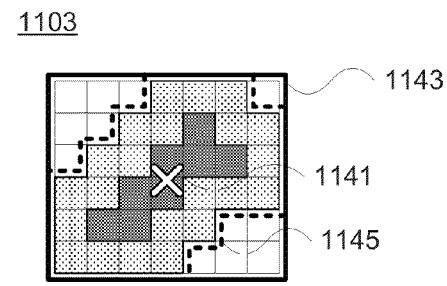
Figure 11F                    Figure 11G

|     | 1n | 2n | 3n |
|-----|----|----|----|
| 1   | 1  | 4  | 9  |
| 2   | 0  | 1  | 4  |
| 3   | 1  | 0  | 1  |

Figure 16A

| 1 | 4 | 8 |
|---|---|---|
| 0 | 1 | 3 |
| 1 | 0 | 0 |

Figure 16B

|   | +  | +  |   |
|---|----|----|---|
|   | 1  | 4  | 8 |
|   | 0* | 1  | 3 |
|   | 1  | 0* | 0 |

Figure 16C

| +  |    |   |
|----|----|---|
| 1  | 4  | 8 |
| 0* | 1  | 3 |
| 1  | 0* | 0'|

| +  |    |   |
|----|----|---|
| 1  | 4  | 8 |
| 0* | 1  | 3 |
| 1  | 0* | 0'|

| +  |    |   |
|----|----|---|
| 1  | 3  | 7 |
| 0* | 0  | 2 |
| 2  | 0* | 0'|

|    | 1  | 3  | 7  |
|----|----|----|----|
| +  | 0* | 0' | 2  |
| +  | 2  | 0* | 0' |

Figure 16G

|    | 1  | 3  | 7  |
|----|----|----|----|
| +  | 0* | 0' | 2  |
| +  | 2  | 0* | 0' |

Figure 16H

|    | 0  | 2  | 6  |
|----|----|----|----|
| +  | 0* | 0' | 2  |
| +  | 2  | 0* | 0' |

Figure 16I

|    | 0' | 2  | 6  |
|----|----|----|----|
| +  | 0* | 0' | 2  |
| +  | 2  | 0* | 0' |

Figure 16J

|    | 0' | 2  | 6  |
|----|----|----|----|
| +  | 0* | 0' | 2  |
| +  | 2  | 0* | 0' |

Figure 16K

|   | 1n | 2n | 3n |
|---|----|----|----|
| 1 | 0* | 2  | 6  |
| 2 | 0' | 0* | 2  |
| 3 | 2  | 0' | 0* |

Figure 16L

CONTACT IDENTIFICATION AND TRACKING ON A CAPACITANCE SENSING ARRAY

RELATED APPLICATIONS

This application claims the benefit of U.S. Provisional Application No. 61/376,656, filed on Aug. 24, 2010, which is hereby incorporated by reference.

TECHNICAL FIELD

This disclosure relates to the field of touch-sensors and, in particular, to contact identification and tracking on a touch-sensor.

BACKGROUND

Computing devices, such as notebook computers, personal data assistants (PDAs), kiosks, and mobile handsets, have user interface devices, which are also known as human interface devices (HID). One user interface device that has become more common is a touch-sensor pad (also commonly referred to as a touchpad). A basic notebook computer touch-sensor pad emulates the function of a personal computer (PC) mouse. A touch-sensor pad is typically embedded into a PC notebook for built-in portability. A touch-sensor pad replicates mouse X/Y movement by using two defined axes which contain a collection of sensor elements that detect the position of one or more conductive objects, such as a finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a pointer, or selecting an item on a display. These touch-sensor pads may include multi-dimensional sensor arrays for detecting movement in multiple axes. The sensor array may include a one-dimensional sensor array, detecting movement in one axis. The sensor array may also be two dimensional, detecting movements in two axes.

Another user interface device that has become more common is a touch screen. Touch screens, also known as touchscreens, touch windows, touch panels, or touchscreen panels, are transparent display overlays which are typically either pressure-sensitive (resistive or piezoelectric), electrically-sensitive (capacitive), acoustically-sensitive (surface acoustic wave (SAW)) or photo-sensitive (infra-red). The effect of such overlays allows a display to be used as an input device, removing the keyboard and/or the mouse as the primary input device for interacting with the display's content. Such displays can be attached to computers or, as terminals, to networks. Touch screens have become familiar in retail settings, on point-of-sale systems, on ATMs, on mobile handsets, on kiosks, on game consoles, and on PDAs where a stylus is sometimes used to manipulate the graphical user interface (GUI) and to enter data. A user can touch a touch screen or a touch-sensor pad to manipulate data. For example, a user can apply a single touch, by using a finger to touch the surface of a touch screen, to select an item from a menu.

BRIEF DESCRIPTION OF THE DRAWINGS

The present disclosure is illustrated by way of example, and not by way of limitation, in the figures of the accompanying drawings.

FIG. 11A illustrates one embodiment of an array with multiple and varied-size touches.

FIGS. 11B and 11C illustrate standard touches on an array.

FIG. 11D illustrates an embodiment of a large touch with two persistent peak nodes.

FIGS. 11E and 11F illustrate embodiments of a large touch with two intermittent or alternating touches.

FIG. 11G illustrates an embodiment of a large touch with a single calculated centroid.

FIGS. 16A-16L illustrate an example of a Hungarian Algorithm applied to multiple touches at two times according to one embodiment.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in a simple block diagram format in order to avoid unnecessarily obscuring the present invention. Thus, the specific details set forth are merely exemplary. Particular implementations may vary from these exemplary details and still be contemplated to be within the spirit and scope of the present invention.

An embodiment of a capacitive sensor array may include sensor elements arranged such that each unit cell corresponding to an intersection between sensor elements may include a main trace and one or more primary subtraces branching away from the main trace. In one embodiment, a sensor element may also include one or more secondary subtraces branching from a primary subtrace, or one or more tertiary subtraces branching from a secondary subtrace. In one embodiment, a sensor array having such a pattern may have decreased signal disparity and reduced manufacturability problems as compared to other patterns, such as a diamond pattern. Specifically, a capacitive sensor array with sensor elements having main traces and subtraces branching from the main trace, such as a totem pole pattern, may be manufactured with decreased cost and increased yield rate, as well as improved optical quality.

An embodiment of such a capacitive sensor array may include a first and a second plurality of sensor elements each intersecting each of the first plurality of sensor elements. Each intersection between one of the first plurality of sensor elements and one of the second plurality of sensor elements may be associated with a corresponding unit cell. In one embodiment, a unit cell corresponding to an intersection may be understood as an area including all locations on the surface of the sensor array that are nearer to the corresponding intersection than to any other intersection between sensor elements.

In one embodiment of a capacitive sensor array, each of the second plurality of sensor elements includes a main trace that crosses at least one of the plurality of unit cells, and further includes, within each unit cell, a primary subtrace that branches away from the main trace. In one embodiment, the primary subtrace may be one of two or more primary subtraces branching symmetrically from opposite sides of the main trace, resembling a "totem pole". Alternatively, the primary subtraces may branch asymmetrically from the main trace.

Figure 1:
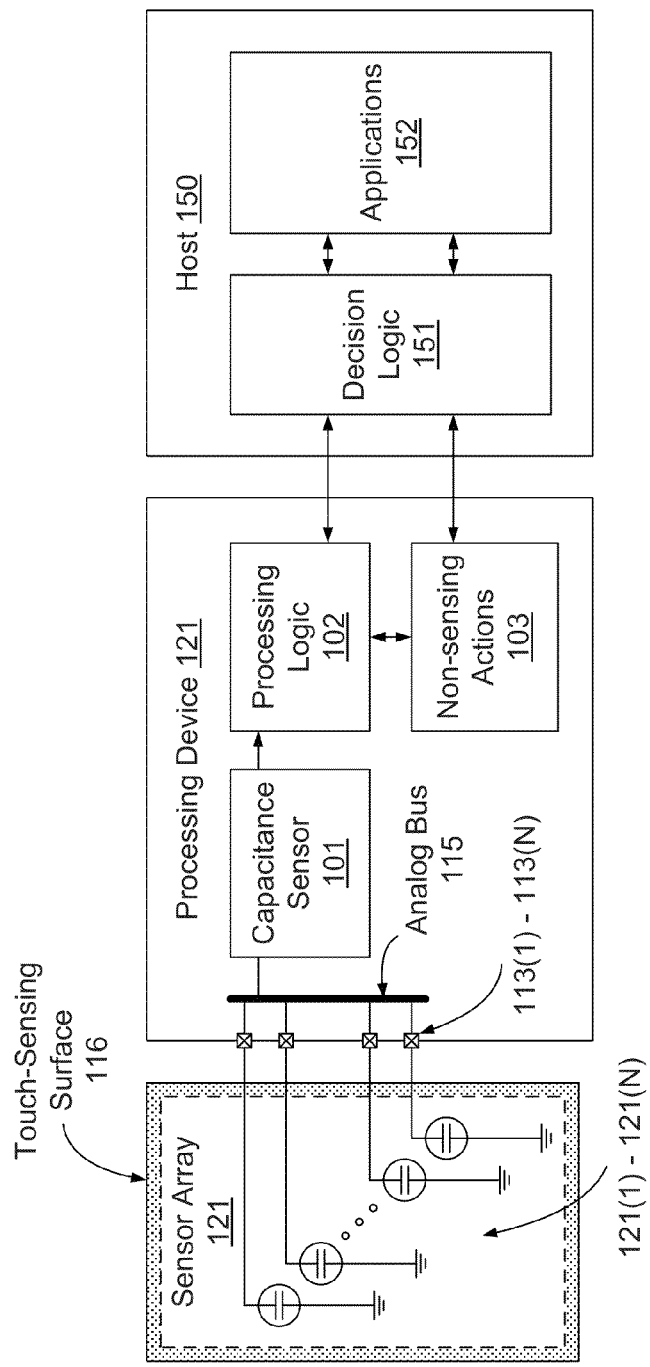
FIG. 1 is a block diagram illustrating an embodiment of an electronic system that processes touch sensor data.

FIG. 1 illustrates a block diagram of one embodiment of an electronic system 100 including a processing device 110 that may be configured to measure capacitances from a touch sensing surface 116 including a capacitive sensor array as described above. The electronic system 100 includes a touch-sensing surface 116 (e.g., a touchscreen, or a touch pad) coupled to the processing device 110 and a host 150. In one embodiment, the touch-sensing surface 116 is a two-dimensional user interface that uses a sensor array 121 to detect touches on the surface 116.

In one embodiment, the sensor array 121 includes sensor elements 121(1)-121(N) (where N is a positive integer) that are disposed as a two-dimensional matrix (also referred to as an XY matrix). The sensor array 121 is coupled to pins 113(1)-113(N) of the processing device 110 via one or more analog buses 115 transporting multiple signals. In this embodiment, each sensor element 121(1)-121(N) is represented as a capacitor.

In one embodiment, the capacitance sensor 101 may include a relaxation oscillator or other means to convert a capacitance into a measured value. The capacitance sensor 101 may also include a counter or timer to measure the oscillator output. The capacitance sensor 101 may further include software components to convert the count value (e.g., capacitance value) into a sensor element detection decision (also referred to as switch detection decision) or relative magnitude. It should be noted that there are various known methods for measuring capacitance, such as current versus voltage phase shift measurement, resistor-capacitor charge timing, capacitive bridge divider, charge transfer, successive approximation, sigma-delta modulators, charge-accumulation circuits, field effect, mutual capacitance, frequency shift, or other capacitance measurement algorithms. It should be noted however, instead of evaluating the raw counts relative to a threshold, the capacitance sensor 101 may be evaluating other measurements to determine the user interaction. For example, in the capacitance sensor 101 having a sigma-delta modulator, the capacitance sensor 101 is evaluating the ratio of pulse widths of the output, instead of the raw counts being over or under a certain threshold.

In one embodiment, the processing device 110 further includes processing logic 102. Operations of the processing logic 102 may be implemented in firmware; alternatively, it may be implemented in hardware or software. The processing logic 102 may receive signals from the capacitance sensor 101, and determine the state of the sensor array 121, such as whether an object (e.g., a finger) is detected on or in proximity to the sensor array 121 (e.g., determining the presence of the object), where the object is detected on the sensor array (e.g., determining the location of the object), tracking the motion of the object, or other information related to an object detected at the touch sensor.

In another embodiment, instead of performing the operations of the processing logic 102 in the processing device 110, the processing device 110 may send the raw data or partially-processed data to the host 150. The host 150, as illustrated in FIG. 1, may include decision logic 151 that performs some or all of the operations of the processing logic 102. Operations of the decision logic 151 may be implemented in firmware, hardware, software, or a combination thereof. The host 150 may include a high-level Application Programming Interface (API) in applications 152 that perform routines on the received data, such as compensating for sensitivity differences, other compensation algorithms, baseline update routines, start-up and/or initialization routines, interpolation operations, or scaling operations. The operations described with respect to the processing logic 102 may be implemented in the decision logic 151, the applications 152, or in other hardware, software, and/or firmware external to the processing device 110. In some other embodiments, the processing device 110 is the host 150.

In another embodiment, the processing device 110 may also include a non-sensing actions block 103. This block 103 may be used to process and/or receive/transmit data to and from the host 150. For example, additional components may be implemented to operate with the processing device 110 along with the sensor array 121 (e.g., keyboard, keypad, mouse, trackball, LEDs, displays, or other peripheral devices).

The processing device 110 may reside on a common carrier substrate such as, for example, an integrated circuit (IC) die substrate, or a multi-chip module substrate. Alternatively, the components of the processing device 110 may be one or more separate integrated circuits and/or discrete components. In one embodiment, the processing device 110 may be the Programmable System on a Chip (PSoC™) processing device, developed by Cypress Semiconductor Corporation, San Jose, Calif. Alternatively, the processing device 110 may be one or more other processing devices known by those of ordinary skill in the art, such as a microprocessor or central processing unit, a controller, special-purpose processor; digital signal processor (DSP), an application specific integrated circuit (ASIC), a field programmable gate array (FPGA), or other programmable device. In an alternative embodiment, for example, the processing device 110 may be a network processor having multiple processors including a core unit and multiple micro-engines. Additionally, the processing device 110 may include any combination of general-purpose processing device(s) and special-purpose processing device(s).

In one embodiment, the electronic system 100 is implemented in a device that includes the touch-sensing surface 116 as the user interface, such as handheld electronics, portable telephones, cellular telephones, notebook computers, personal computers, personal data assistants (PDAs), kiosks, keyboards, televisions, remote controls, monitors, handheld multi-media devices, handheld video players, gaming devices, control panels of a household or industrial appliances, or other computer peripheral or input devices. Alternatively, the electronic system 100 may be used in other types of devices. It should be noted that the components of electronic system 100 may include all the components described above. Alternatively, electronic system 100 may include only some of the components described above, or include additional components not listed herein.

Figure 2:
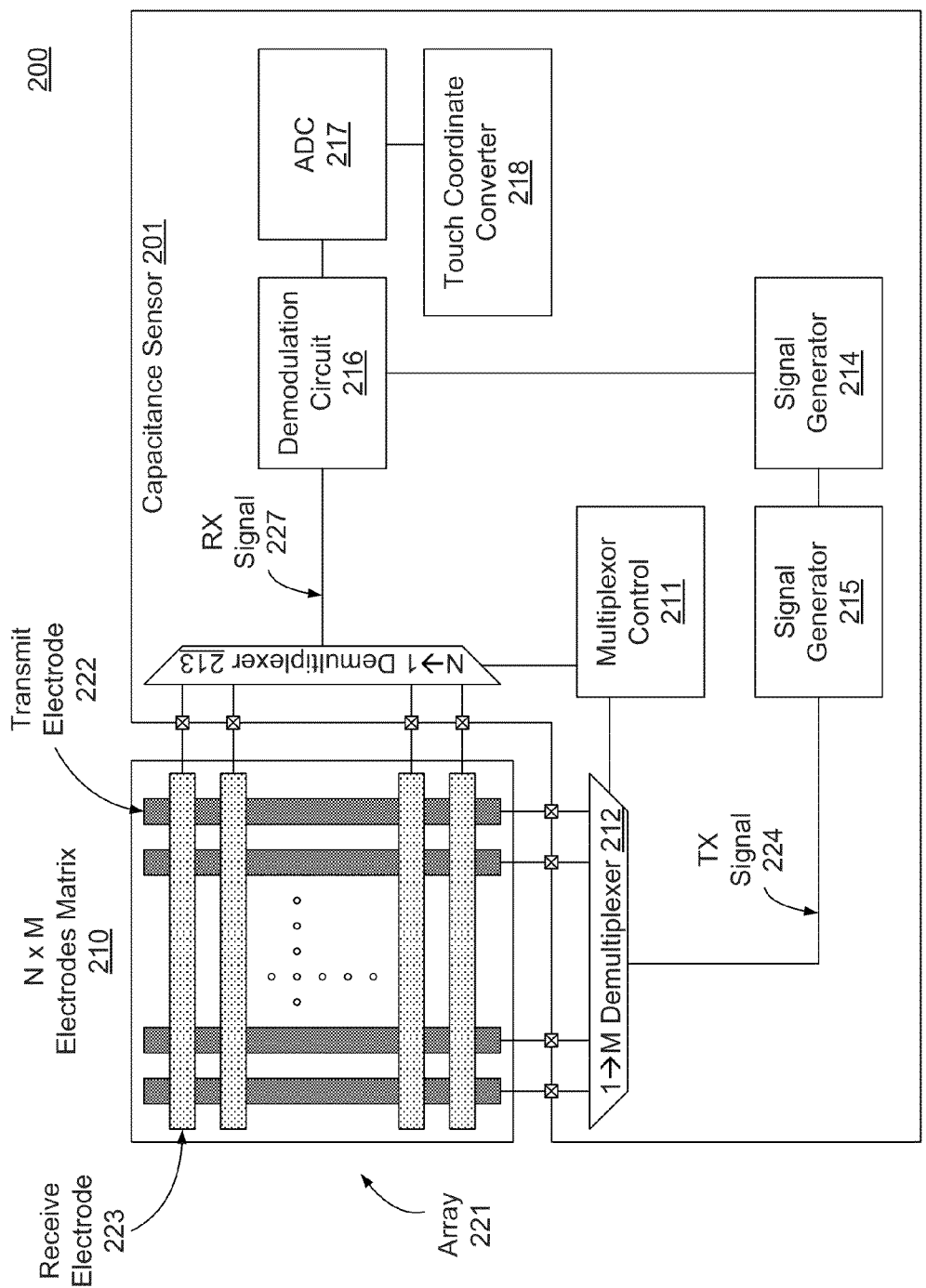
FIG. 2 is a block diagram illustrating an embodiment of an electronic system that processes touch sensor data.

FIG. 2 is a block diagram illustrating one embodiment of a capacitive touch sensor array 121 and a capacitance sensor 101 that converts measured capacitances to coordinates. The coordinates are calculated based on measured capacitances. In one embodiment, sensor array 121 and capacitance sensor 101 are implemented in a system such as electronic system 100. Sensor array 220 includes a matrix 225 of N×M electrodes (N receive electrodes and M transmit electrodes), which further includes transmit (TX) electrode 222 and receive (RX) electrode 223. Each of the electrodes in matrix 225 is connected with capacitance sensor 201 through demultiplexer 212 and multiplexer 213.

Capacitance sensor 101 includes multiplexer control 211, demultiplexer 212 and multiplexer 213, clock generator 214, signal generator 215, demodulation circuit 216, and analog to digital converter (ADC) 217. ADC 217 is further coupled with touch coordinate converter 218. Touch coordinate converter 218 outputs a signal to the processing logic 102.

The transmit and receive electrodes in the electrode matrix 225 may be arranged so that each of the transmit electrodes overlap and cross each of the receive electrodes such as to form an array of intersections, while maintaining galvanic isolation from each other. Thus, each transmit electrode may be capacitively coupled with each of the receive electrodes. For example, transmit electrode 222 is capacitively coupled with receive electrode 223 at the point where transmit electrode 222 and receive electrode 223 overlap.

Clock generator 214 supplies a clock signal to signal generator 215, which produces a TX signal 224 to be supplied to the transmit electrodes of touch sensor array 121. In one embodiment, the signal generator 215 includes a set of switches that operate according to the clock signal from clock generator 214. The switches may generate a TX signal 224 by periodically connecting the output of signal generator 215 to a first voltage and then to a second voltage, wherein said first and second voltages are different.

The output of signal generator 215 is connected with demultiplexer 212, which allows the TX signal 224 to be applied to any of the M transmit electrodes of touch sensor array 121. In one embodiment, multiplexer control 211 controls demultiplexer 212 so that the TX signal 224 is applied to each transmit electrode 222 in a controlled sequence. Demultiplexer 212 may also be used to ground, float, or connect an alternate signal to the other transmit electrodes to which the TX signal 224 is not currently being applied.

Because of the capacitive coupling between the transmit and receive electrodes, the TX signal 224 applied to each transmit electrode induces a current within each of the receive electrodes. For instance, when the TX signal 224 is applied to transmit electrode 222 through demultiplexer 212, the TX signal 224 induces an RX signal 227 on the receive electrodes in matrix 225. The RX signal 227 on each of the receive electrodes can then be measured in sequence by using multiplexer 213 to connect each of the N receive electrodes to demodulation circuit 216 in sequence.

The mutual capacitance associated with each intersection between a TX electrode and an RX electrode can be sensed by selecting every available combination of TX electrode and an RX electrode using demultiplexer 212 and multiplexer 213. To improve performance, multiplexer 213 may also be segmented to allow more than one of the receive electrodes in matrix 225 to be routed to additional demodulation circuits 216. In an optimized configuration, wherein there is a 1-to-1 correspondence of instances of demodulation circuit 216 with receive electrodes, multiplexer 213 may not be present in the system.

When an object, such as a finger, approaches the electrode matrix 225, the object causes a decrease in the mutual capacitance between only some of the electrodes. For example, if a finger is placed near the intersection of transmit electrode 222 and receive electrode 223, the presence of the finger will decrease the mutual capacitance between electrodes 222 and 223. Thus, the location of the finger on the touchpad can be determined by identifying the one or more receive electrodes having a decreased mutual capacitance in addition to identifying the transmit electrode to which the TX signal 224 was applied at the time the decreased mutual capacitance was measured on the one or more receive electrodes.

By determining the mutual capacitances associated with each intersection of electrodes in the matrix 225, the locations of one or more touch contacts may be determined. The determination may be sequential, in parallel, or may occur more frequently at commonly used electrodes.

In alternative embodiments, other methods for detecting the presence of a finger or conductive object may be used where the finger or conductive object causes an increase in capacitance at one or more electrodes, which may be arranged in a grid or other pattern. For example, a finger placed near an electrode of a capacitive sensor may introduce an additional capacitance to ground that increases the total capacitance between the electrode and ground. The location of the finger can be determined from the locations of one or more electrodes at which an increased capacitance is detected.

The induced current signal 227 is rectified by demodulation circuit 216. The rectified current output by demodulation circuit 216 can then be filtered and converted to a digital code by ADC 217.

The digital code is converted to touch coordinates indicating a position of an input on touch sensor array 121 by touch coordinate converter 218. The touch coordinates are transmitted as an input signal to the processing logic 102. In one embodiment, the input signal is received at an input to the processing logic 102. In one embodiment, the input may be configured to receive capacitance measurements indicating a plurality of row coordinates and a plurality of column coordinates. Alternatively, the input may be configured to receive row coordinates and column coordinates.

In one embodiment, the sensor array 121 can be configured to detect multiple touches. One technique for multi-touch detection uses a two-axis implementation: one axis to support rows and another axis to support columns. Additional axes, such as a diagonal axis, implemented on the surface using additional layers, can allow resolution of additional touches.

Figure 3A:
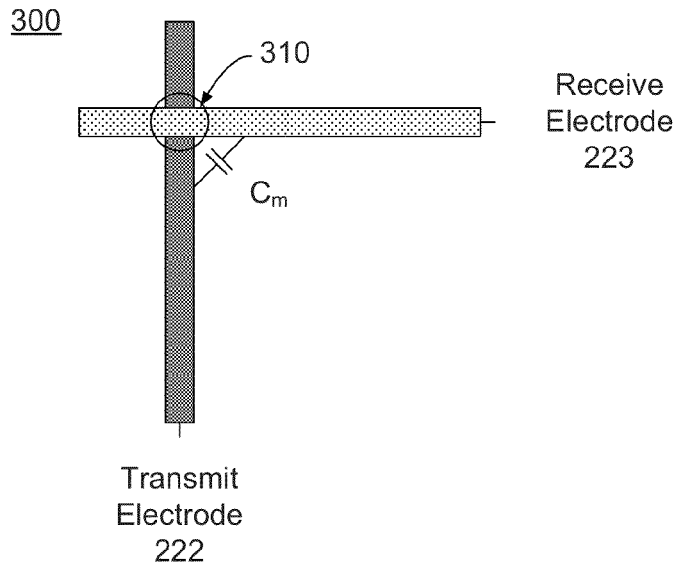
FIG. 3A illustrates an embodiment of a transmit and receive electrode in a mutual capacitance array.

FIG. 3A illustrates an embodiment of a simplified representation 300 of an embodiment of a single intersection, or node 310, of a transmit electrode 222 and a receive electrode 223. Transmit electrode 222 is coupled to 1→N multiplexer 212 and receive electrode 223 is coupled to N→1 demultiplexer 213 as shown in FIG. 2. Node 310 is characterized by mutual capacitance, Cm, between transmit electrode 222 and receive electrode 223. A mutual capacitance, Cm, exists for every intersection between every transmit electrode and every receive electrode in N×M electrode matrix 225 (shown in FIG. 2).

Figure 3B:
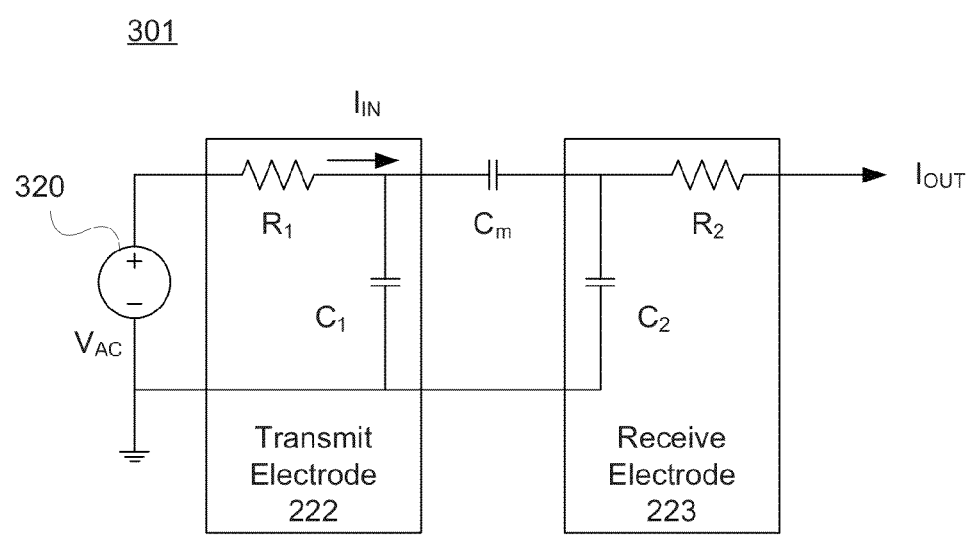
FIG. 3B illustrates a schematic representation of a transmit and receive electrode in a mutual capacitance array.

FIG. 3B illustrates a circuit representation 301 of a single intersection, or node 310, from FIG. 3A. Transmit electrode 222 comprises a resistance, R1, and a parasitic capacitance, C1. Receive electrode 223 comprises a resistance, R2, and a parasitic capacitance, C2. Resistances R1 and R2 are a function of the impedance of transmit electrode 222 and receive electrode 223, respectively. High impedance materials, such as indium tin oxide, limit the rate of charge and discharge on transmit and receive electrodes. Capacitors C1 and C2 represent the parasitic capacitance each electrode has to the rest of the array and the rest of the system for each transmit electrode 222 and each receive electrode 223, respectively. Parasitic capacitances C1 and C2 are the capacitance of each electrode to everything in the system except the transmit or receive electrode that comprises the other side of node 310. Voltage source 320 may provide an alternating voltage source (signal) on transmit electrode 222, thus generating a current, Iin, through resistor R1, and building a voltage potential on mutual capacitor Cm. This voltage potential is then converted to a current, Iout, through resistor R2. Current Iout is representative of the mutual capacitance, Cm, between transmit electrode 222 and receive electrode 223.

FIG. 4 illustrates an embodiment of a capacitive touch sensing system 400 that includes a capacitive sensor array 420. Capacitive sensor array 420 includes a plurality of row sensor elements 431-445 and a plurality of column sensor elements 450-459. The row and column sensor elements 431-445 and 450-459 are connected to a processing device 405, which may include the functionality of capacitance sensor 101 of FIG. 1 or capacitance sensor 201 of FIG. 2. In one embodiment, the processing device 405 may perform TX-RX scans of the capacitive sensor array 420 to measure a mutual capacitance value associated with each of the intersections, or nodes, 410, between a row sensor element and a column sensor element in the sensor array 420. The measured capacitances may be further processed to determine centroid, or center of mass, locations of one or more contacts at the capacitive sensor array 420.

In one embodiment, the processing device 405 is connected to a host 150 which may receive the measured capacitances or calculated centroid locations from the processing device 405.

Figure 4A:
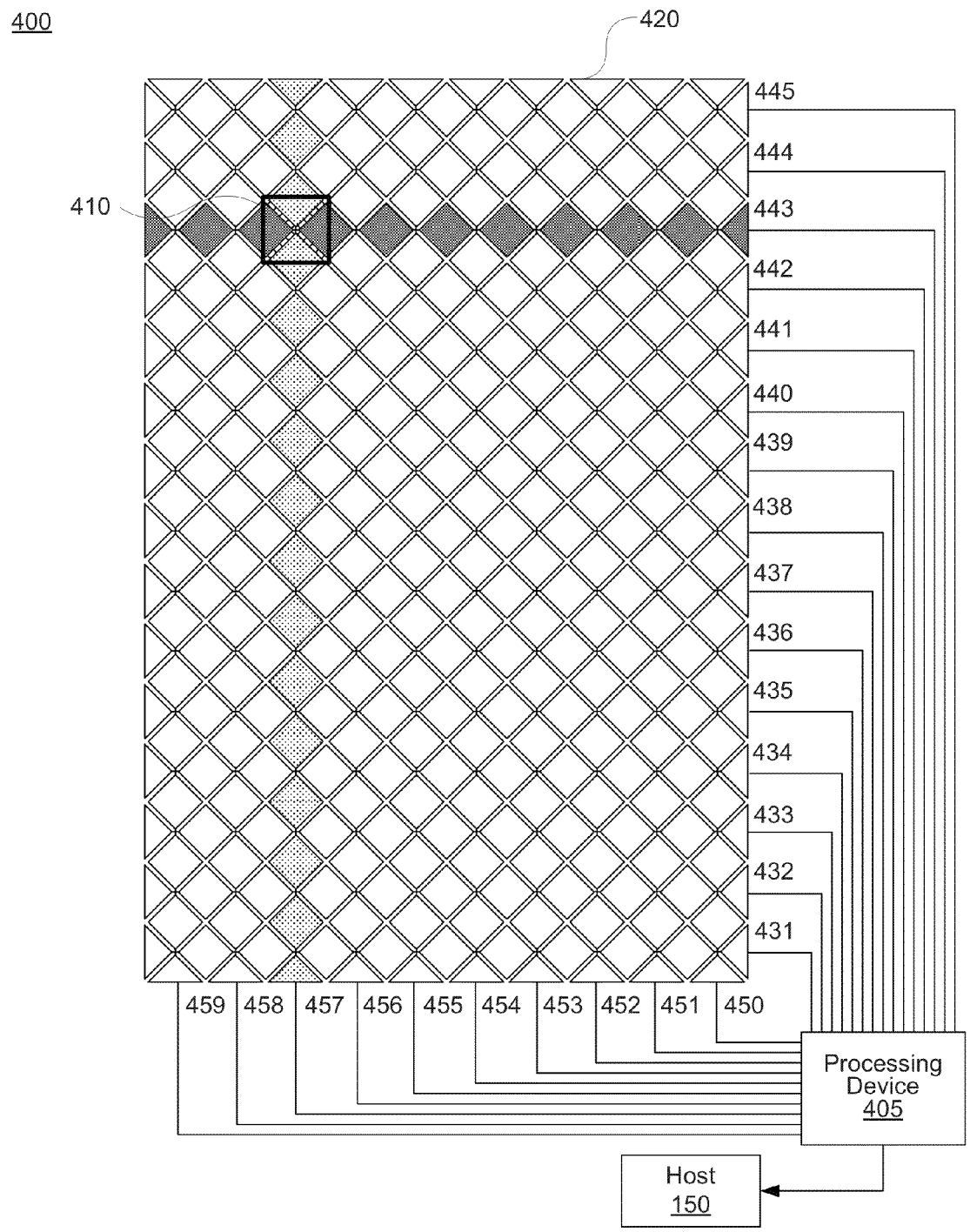
FIG. 4A illustrates an embodiment of a capacitive sensor array having a diamond pattern.

The sensor array 420 illustrated in FIG. 4A may include sensor elements arranged in a diamond pattern. Specifically, the sensor elements 431-448 of sensor array 420 may be arranged in a single solid diamond (SSD) pattern as shown in FIG. 4A. In other embodiments, the sensors elements 431-445 and 450-459 may be hollow diamonds ("single hollow diamonds") or may be pairs of diamonds coupled at one or both ends ("dual solid diamonds"). In another embodiment, pairs of hollow diamonds may be coupled at one or both ends ("dual hollow diamonds").

Figure 4B:
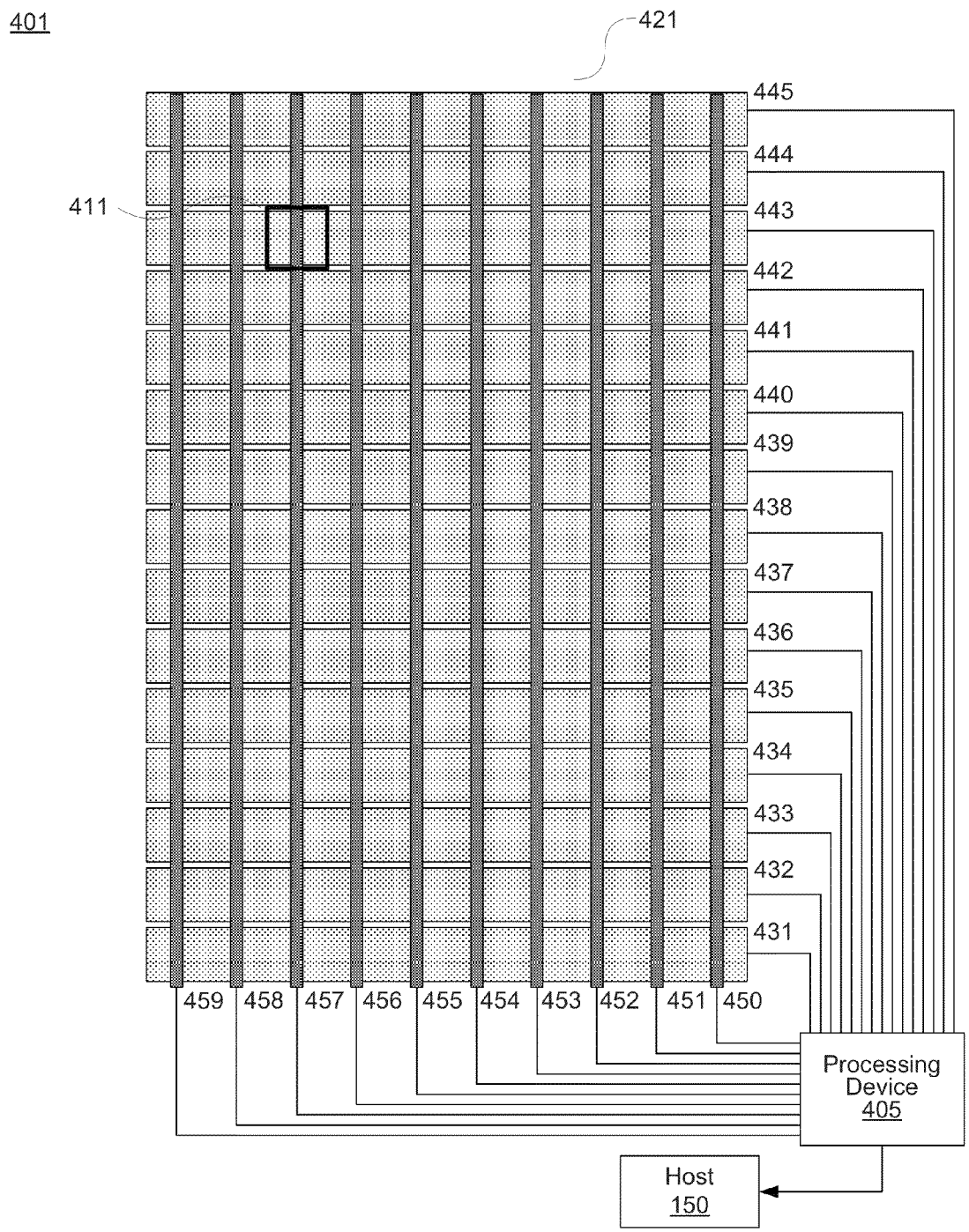
FIG. 4B illustrates an embodiment of a capacitive sensor array having "bars and stripes."

FIG. 4B illustrates a capacitive sensor array 421 in an alternate embodiment. Sensor array 421 may comprise a series of stripes (431-445) and bars (450-459). The processing device 405 may perform TX-RX scans of the capacitive sensor array 421 to measure a mutual capacitance value associated with each of the intersections, 411, between a row sensor element and a column sensor element in the sensor array 420.

Figure 4C:
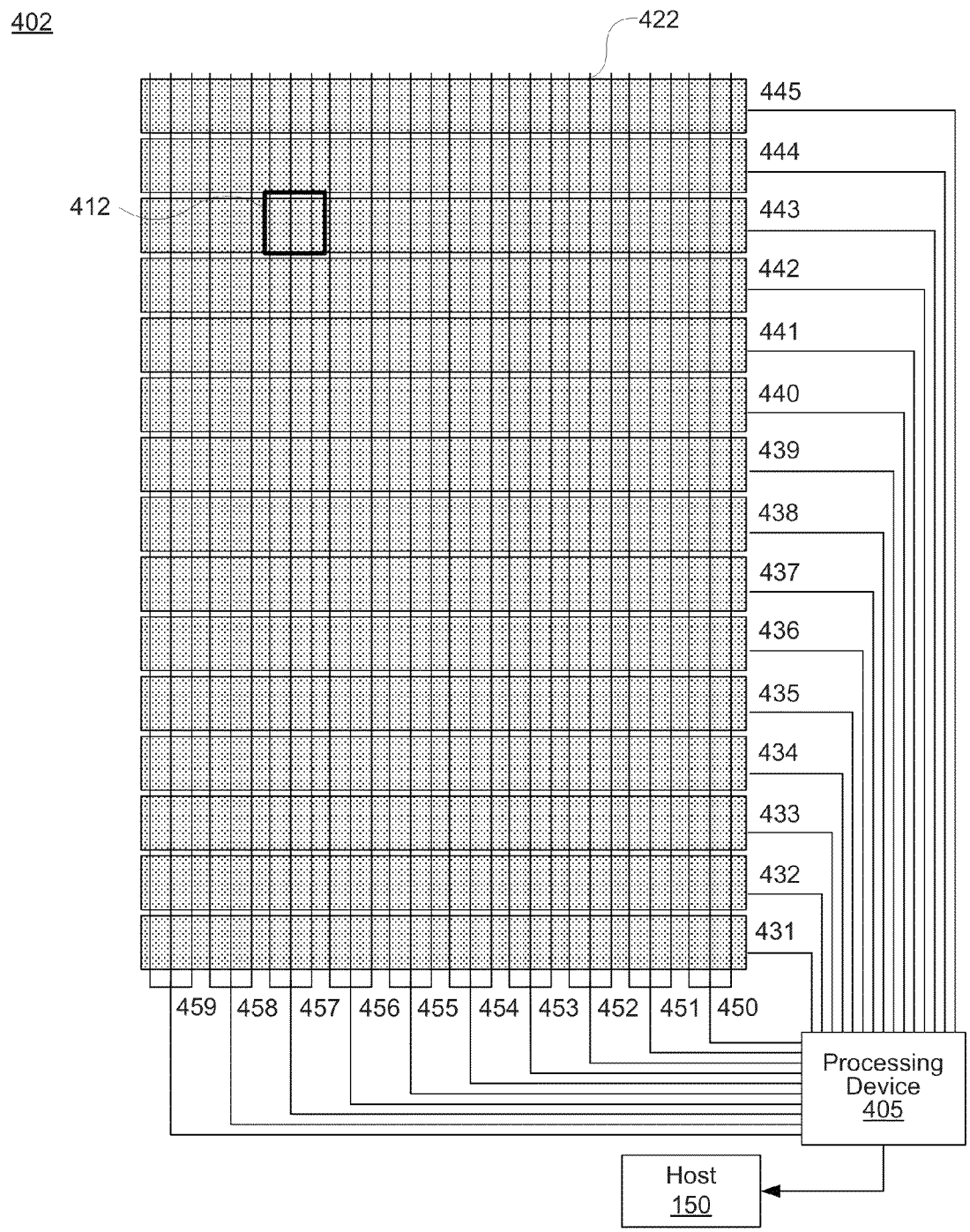
FIG. 4C illustrates an embodiment of a capacitive sensor array having "bars and stripes."

FIG. 4C illustrates a capacitive sensor array 422 in an alternate embodiment. Sensor array 422 may comprise a series of stripes (431-445) and bars (450-459), wherein the bars are split into three smaller bars and connected at one or both ends of capacitive sensor array 422. Each bar of the trident formed is electrically equivalent, but more capacitive coupling between transmit bars 450-459 and stripes 431-445 may be accessible to conductive objects such as user fingers and therefore a greater change in capacitance may be measured. The processing device 405 may perform TX-RX scans of the capacitive sensor array 422 to measure a mutual capacitance value associated with each of the intersections, 412, between a row sensor element and a column sensor element in the sensor array 422. While FIG. 4C illustrates bars 450-459 as having three smaller bars, it is understood that bars 450-459 may have fewer than three smaller bars or more than three smaller bars as needed or allowed by the applications requirements.

The self capacitance and mutual capacitance sensing methods described are meant to be exemplary only. Other methods of self capacitance and mutual capacitance may be utilized to detect capacitance on rows and columns in a self capacitance array or for each array in a mutual capacitance array. Furthermore, self capacitance sensing methods may be used to measure capacitance in all-points-addressable or other multi-touch arrays by increasing the number of sensing inputs. Likewise, mutual capacitance sensing methods may be used to measure capacitance on single-touch arrays. In such embodiments, the same circuitry and processing may be used, but only a single contact may be detected and tracked on the array. In one embodiment, additional contacts that are detected on a multi-touch array may be ignored completely. In another embodiment, capacitance data from additional contacts may be used to determine the location of a single contact based on capacitance data from the entire array.

In one embodiment of a capacitive sensing device configured to measure mutual capacitance, capacitance values for each node (310) may be stored in a memory such as RAM, ROM, flash or other storage locations. Capacitance values may be the "raw" capacitance values for each node or the compensated capacitance value calculated by subtracting a base capacitance value indicative of a sensor with no conductive object present (i.e. baseline) from the raw capacitance values. In this embodiment, the compensated capacitance values are non-zero only for active nodes, that is, nodes at which there is measurable capacitance change from capacitance measured with no contacts present on the array.

Compensated capacitance values may then be used to determine the presence, size, and location of a single or multiple contact locations on the sensing array. For sensing arrays configured to measure capacitance at nodes or intersections across the sensing array, the resulting image of a capacitance sensing scan may appear as that illustrated in FIG. 5A. FIG. 5A illustrates an embodiment of an array 500 of capacitance sensing nodes that arise from eight columns and ten rows as illustrated in the embodiments described with reference to FIGS. 4A-C. Each square 505 is indicative of a single intersection between rows and columns. In a mutual capacitance array, each square 505 is indicative of the node 310 (FIG. 3)

formed from transmit electrode 222 and receive electrode 223. The mutual capacitance of each node may be measured by a capacitance sensor 201 and stored in a memory. For a single touch, the array will show a single "peak" node 510 as well as strong nodes 520, weak nodes 530 and inactive nodes 540. In one embodiment, a 5×5 matrix of nodes 550 may be used to calculate the center of mass, or "centroid" 560, of a contact on the sensing array 500. This means that twenty-five nodes may be used in the calculation of the centroid. The X- and Y-location of the contact is given by the following equations:

$$X_c = \frac{ResX}{N_x} \cdot \left[ i + \frac{1}{2} + \frac{2 \cdot S_{i+2} + S_{i+1} - S_{i-1} - 2 \cdot S_{i-2}}{S_{i-2} + S_{i-1} + S_i + S_{i+1} + S_{i+2}} \right]$$

$$Y_c = \frac{ResX}{Ny} \cdot \left[ j + \frac{1}{2} + \frac{2 \cdot S_{j+2} + S_{j+1} - S_{j-1} - 2 \cdot S_{j-2}}{S_{j-2} + S_{j-1} + S_j + S_{j+1} + S_{j+2}} \right]$$

where $N_x$ is number of columns, ResX is resolution in X direction, S is the sum of signals from each column of 5×5 matrix around local maximum and i is the index of local maximum along the x-axis, and where $N_y$, number of rows, ResY is the resolution in Y direction, $S_j$ is the sum of signals from each row of 5×5 matrix around local maximum and j is the index of local maximum.

While the contact is on the sensor array such that the peak node 510 is at least two nodes from the edge, a complete 25-node array may be used to calculate position. However, as illustrated in FIG. 5B, as the contact moves toward the edge of the array 500 such that peak node 510 is less than two nodes from the edge, some capacitance data 552 may be lost due to the fact that no sensors exist to detect the capacitance. In this situation, the reported position will be missing data from the left-most part of the touch, causing the reported centroid 560 to shift to the right.

Figure 5C:
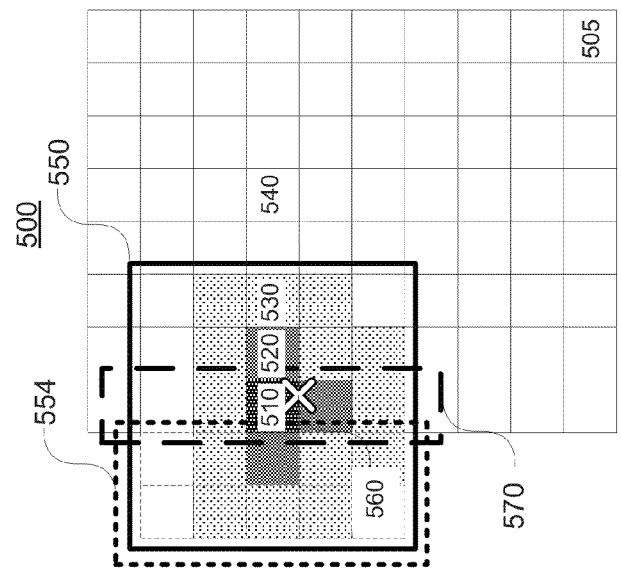
FIG. 5A-C illustrate an embodiment of contact centroid calculation using a full 5×5 matrix.
Figure 5B:
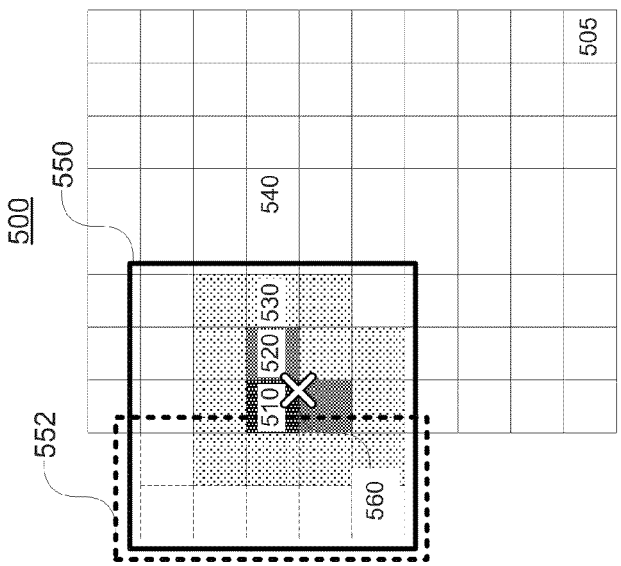
Figure 5A:
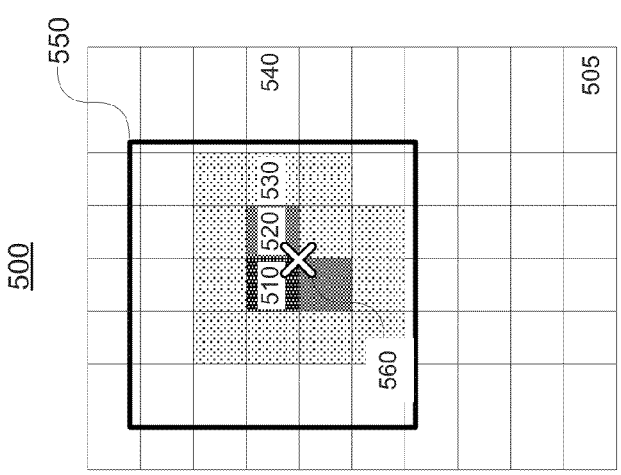

In one embodiment, illustrated in FIG. 5C, the capacitance values detected at the nodes immediately right of the meridian 570 of sensors defined by the peak node 510 is mirrored and "virtual nodes" 554 are created. Virtual nodes 554 are not present on the array, but exist only in software, a memory location, or in device firmware. In one embodiment, virtual nodes 554 may only exist as part of an algorithm for calculating contact position. The algorithm may be executed in software by a processing device which is configured to execute commands based on programming stored in a memory location. The memory may be Flash, RAM, ROM or any other recordable medium. Virtual nodes 554 are used to calculate the centroid 560 of the contact by filling in the missing nodes that are non-existent due to peak node 510's presence at the edge of the array 500. In another embodiment, the virtual electrodes themselves might not even exist. In this embodiment, the virtual electrodes may only be a reference to a real node on the array so that the processor uses the real value twice, but once in reference to a virtual position, when calculating the contact location.

Figure 6:
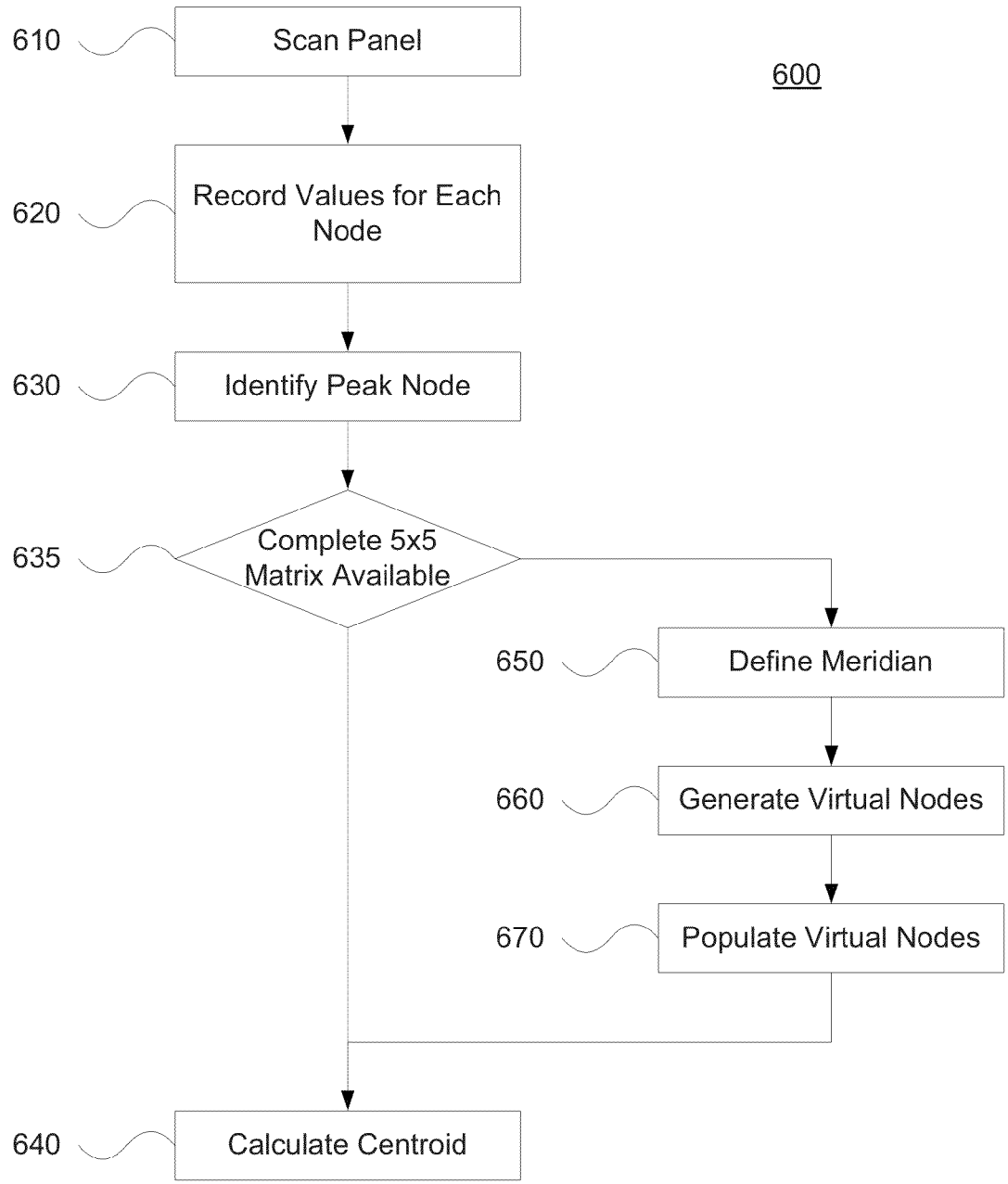
FIG. 6 illustrates a method for calculating centroid using dummy cells.

FIG. 6 illustrates one embodiment of a method for calculating contact position on the array, including when the contact is at the edge of the array. The capacitance array is first scanned in block 610. In one embodiment, the array may be scanned using the capacitance sensor 201 illustrated in FIG. 2. Capacitance values, either raw or compensated, may be recorded for each node in block 620. In one embodiment, the node with the largest value is determined to be the "peak" node in block 630 by touch coordinate converter 218 illustrated in FIG. 2. In decision block 635, the peak node is viewed with respect to the entire array and if it is far enough away from the edge to create a complete 5×5 matrix using nodes in the array, the centroid is calculated in block 640. If the peak node is close enough to the edge so as to have an incomplete 5×5 matrix, a meridian is defined based on either the row or the column or both of the peak sensor in block 650. Virtual electrodes are then created based on the required number of electrodes to complete the 5×5 matrix in block 660. Each of the virtual electrodes are populated with data from its real node mirror image in block 670 and the now-completed 5×5 matrix is used to calculate the centroid.

While a contact location on the left edge of the array is illustrated in FIGS. 5B and 5C, and described method of FIG. 6, it would be clear to one of ordinary skill in the art that the same method may be used if contact location is at the right edge, or at the top or bottom of the array. Furthermore, it would be clear to one of ordinary skill in the art that the same method may be used if the contact location at one of the corners of the array. In such a case, two meridians are defined in step 650 and the virtual electrodes are populated by their respective sensors along both rows and columns. While FIGS. 5A-C illustrate embodiment using a 5×5 matrix and associated virtual electrodes, in some embodiments, larger or smaller matrices may in used. For example, in smaller arrays with greater sensitivity, it may be advantageous to reduce the matrix to a 3×3 collection of nodes. In other embodiments, perhaps designed for larger arrays or arrays capable of detecting larger contacts, larger matrices may be used, such as 7×7 or even 9×9.

Figure 7C:
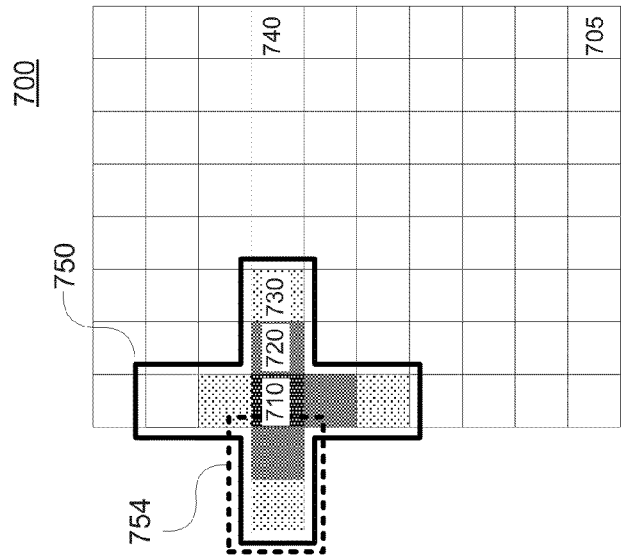
FIG. 7A-C illustrate an embodiment of contact centroid calculation using a nine-sensor matrix.
Figure 7B:
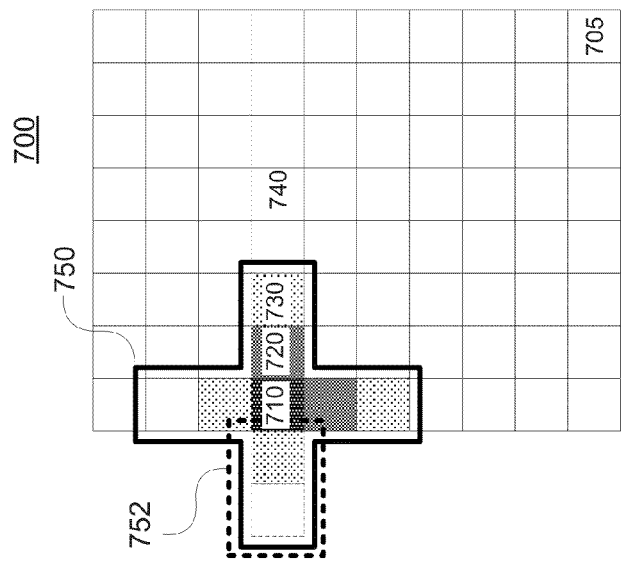
Figure 7A:
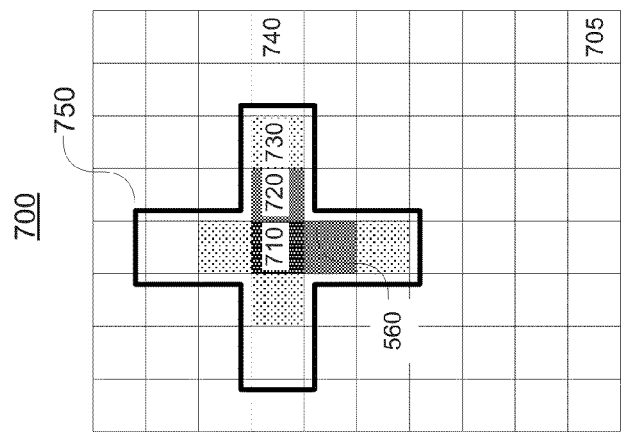

In another embodiment, illustrated in FIGS. 7A-C, a subset of the active sensor may be used to calculate position. An 8×10 array 700 is scanned and capacitance data gathered for each of the nodes 505 on the array. A peak node 710 is identified as well as a group of sensors 560 immediately adjacent to the peak node in each of the four directions. The additional sensors may have strong values, such as node 720, or weaker values, such as node 730. As illustrated in FIG. 7A, the peak node 710 is used to determine a row and a column of nodes at which the intersection is the peak node. Instead of a 5×5 matrix of nodes used to calculate the centroid for the contact, four column nodes, four row electrodes, and the peak electrode are used. In this embodiment, the number of nodes used is only nine. As illustrated in FIG. 7B, only two virtual electrodes 752 need be created and populated as the peak node 510 moves toward the left edge of the array 500. Instead of ten virtual nodes being created and populated as illustrated in FIG. 5C, FIG. 7C illustrates that only two virtual nodes 754 are created and populated. In this embodiment, the memory and processing overhead is decreased, thus decreasing the processing time and increasing the response time for the array. In one embodiment the configuration of FIGS. 7A-C may use the same method illustrated in FIG. 6, except that a group of nine sensors is defined rather than an N×M matrix.

While FIGS. 7A-C illustrate embodiment using a nine nodes and associated virtual electrodes, in some embodiments, more or fewer nodes may in used. For example, in smaller arrays with greater sensitivity, it may be advantageous to reduce the matrix to a collection of five nodes, a peak node and one node in each direction. In other embodiments, perhaps designed for larger arrays or arrays capable of detecting larger contacts, larger collections may be used, such as thirteen or even seventeen.

Figure 8A:
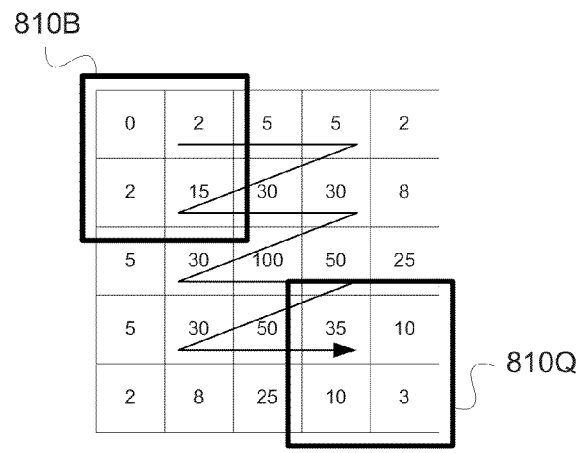
FIG. 8 illustrates an example of using vectors from 2×2 matrices to calculate contact position.
Figure 8B:
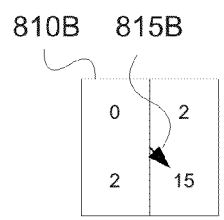
Figure 8C:
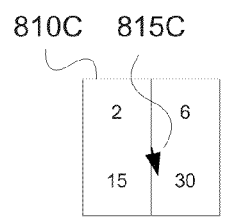
Figure 8D:
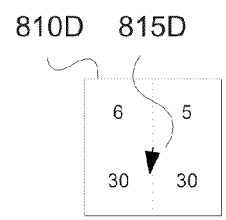
Figure 8E:
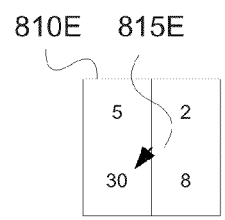
Figure 8F:
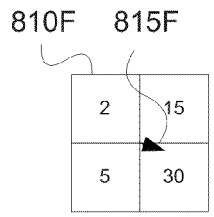
Figure 8G:
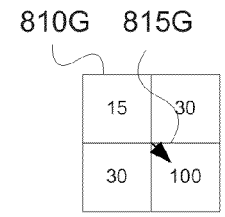
Figure 8H:
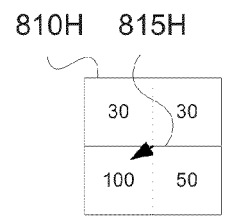
Figure 8I:
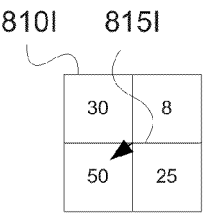

In another embodiment, illustrated in FIG. 8A, the 5×5 550 matrix of nodes that is used to calculate the centroid of the contact location from FIG. 5A is used to define sixteen 2×2 matrices of nodes, 810B-Q, used to define a vector directions, 815B-Q. Each 2×2 matrix 810B-Q that is derived from the 5×5 matrix is illustrated in FIGS. 8B-Q. Each node in the 2×2 matrix "pulls" the vector 815B-Q toward its corner. The vector of each node in the 2×2 matrix 810B-Q is then summed to create a vector 815B-Q for the 2×2 matrix. The vector direction of each 2×2 matrix points toward the center of mass 820 of the contact location, somewhere inside the area defined by the peak node 510.

The vector 810B-Q of each 2×2 node is given by:

$$grad_x f = \frac{f(x_2 \cdot y_1) + f(x_2 \cdot y_2) - f(x_1 \cdot y_1) - f(x_1 \cdot y_2)}{2}$$

$$grad_y f = \frac{f(x_1 \cdot y_2) + f(x_2 \cdot y_2) - f(x_1 \cdot y_1) - f(x_2 \cdot y_1)}{2},$$

where f(x1,y1), f(x2,y1, f(x1,y2) and f(x2,y2) correspond to the top-left, top-right, bottom-left, and bottom-right cells of each 2×2 matrix of FIGS. 8B-Q.

The line equation for the vector is given by:

$$grad_x f \cdot y - grad_y f \cdot x + \frac{1}{2}[grad_y f \cdot (x_1 + x_2) - grad_x f \cdot (y_1 + y_2)] = 0.$$

The intersection of all of the vectors defines the center of mass 820 and is given by:

$$x = \frac{\sum_i a_i^2 \cdot \sum_i c_i \cdot b_i - \sum_i a_i \cdot b_i \cdot \sum_i a_i \cdot c_i}{\sum_i a_i^2 \cdot \sum_i b_i^2 - \left(\sum_i a_i \cdot b_i\right)^2}$$

$$y = \frac{\sum_i a_i \cdot b_i \cdot \sum_i c_i \cdot b_i - \sum_i b_i^2 \cdot \sum_i a_i \cdot c_i}{\sum_i a_i^2 \cdot \sum_i b_i^2 - \left(\sum_i a_i \cdot b_i\right)^2}$$

where
a=$grad_x f$
b=$grad_y f$ $$c = \frac{1}{2}[grad_y f \cdot (x_1 + x_2) - grad_x f \cdot (y_1 + y_2)]$$

An advantage of this embodiment is that no extra processing is required when the contact location is near the edge of the array 500. In this case, the vectors from the non-edge 2×2 matrices still point to the center of mass of the contact location, so their intersection may be used to calculate the position of the contact on the array.

Figure 8S:
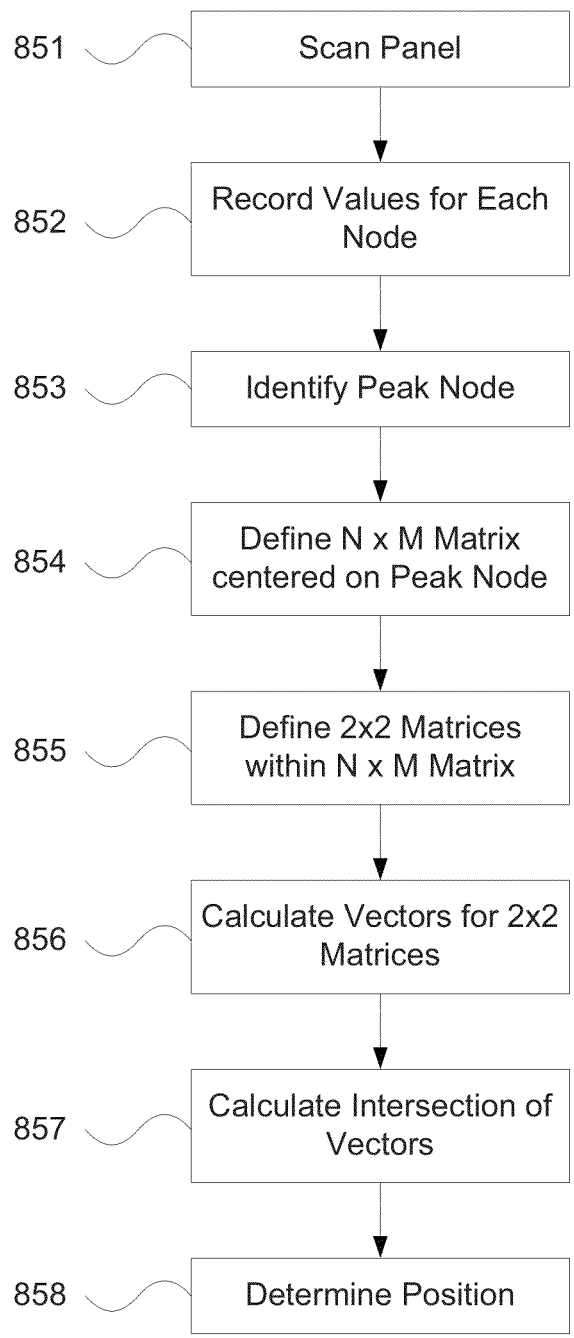

FIG. 8S illustrate on embodiment of a method 850 for determining contact location as illustrated in FIGS. 8A-R. In a first step, the panel may be scanned in block 851 using capacitance sensor 201 of FIG. 2. Values for each node 310 shown in FIG. 3A may be recorded in a memory or sent to a host 150. Recording the values may be done in block 852. Of the nodes 310 a peak node similar to node 510 of FIGS. 5A-C may be identified and an N×M matrix defined about the peak node on block 854. The N×M matrix may comprise a number of partially overlapping 2×2 matrices as illustrated in FIG. 8A. In one embodiment, these matrices may be defined in block 855. Each matrix from block 855 may be used to calculate a vector of the common corner of each cell of each matrix in block 856. In one embodiment, the intersection of all the vectors from block 856 may be calculated in block 857 and the position of the intersection may be output as the contact location in block 858.

Figure 9A:
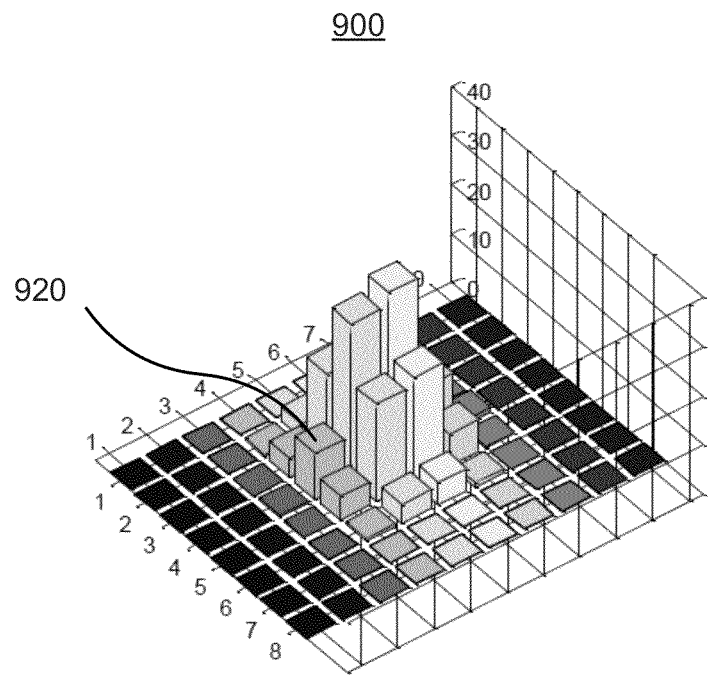
FIG. 9A illustrates an embodiment 8×9 matrix of sensors with their corresponding capacitance values on the Z axis.
Figure 9B:
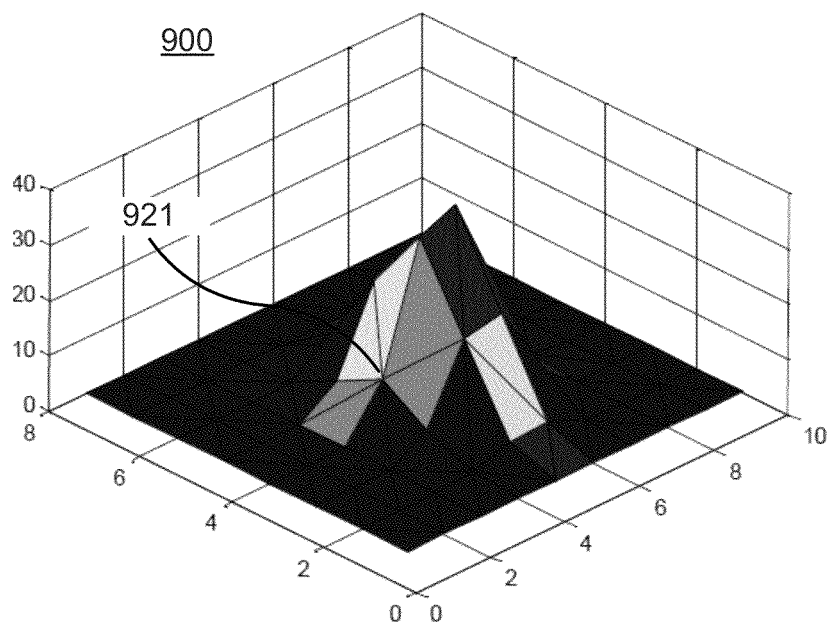
FIG. 9B illustrates an embodiment of a three-dimensional rendering of a contact on an array

Still another embodiment for calculating contact position on a capacitance sensing array is illustrated in FIGS. 9A-D. FIG. 9A illustrates a three-dimensional representation 900 of the signal 920 on each of the nodes of an 8×9 matrix. The value of the capacitance change due to the contact of a conductive object is shown as a vertical bar at each of the seventy-two nodes in the array. Nodes with a greater amount of capacitance change from a baseline are shown as having a taller vertical bar. In the embodiment shown in FIG. 9A, only a single touch is shown. However, it would be clear that such an approach could be used to demonstrate and calculate the position of two sensors on the array. In such a case, there might be two groups of vertical bars spaced apart by some distance. The embodiment shown in FIG. 9A has only 8 columns and 9 rows. This is not intended to be limiting. In fact, a sensor design could be constructed that has any number of columns and rows. The limitation is only how many inputs the capacitance measurement circuitry has and may be expanded by coupling the transmit and receive electrodes to multiple capacitance sensing circuits. The capacitance values of each node in the matrix may be determined and recorded.

Using these capacitance sensing values, a line is drawn from the three-dimensional location of each node to the eight nodes around it. The three-dimensional location is given by the column number and the row number to establish X- and Y-locations and the change in capacitance to establish the Z-height. This creates an image of the array similar to that shown in FIG. 9B. Each intersection 921 of eight points represents one of the vertical bars 920 from FIG. 9A and a three-dimensional rendering 901 of the touch on the array is generated. Using this three-dimensional rendering 901, a perimeter can be defined for a plurality of "heights." That is, at defined capacitances, a horizon is defined and a line drawn around the three-dimensional rendering 901 of the contact on the array.

Figure 9C:
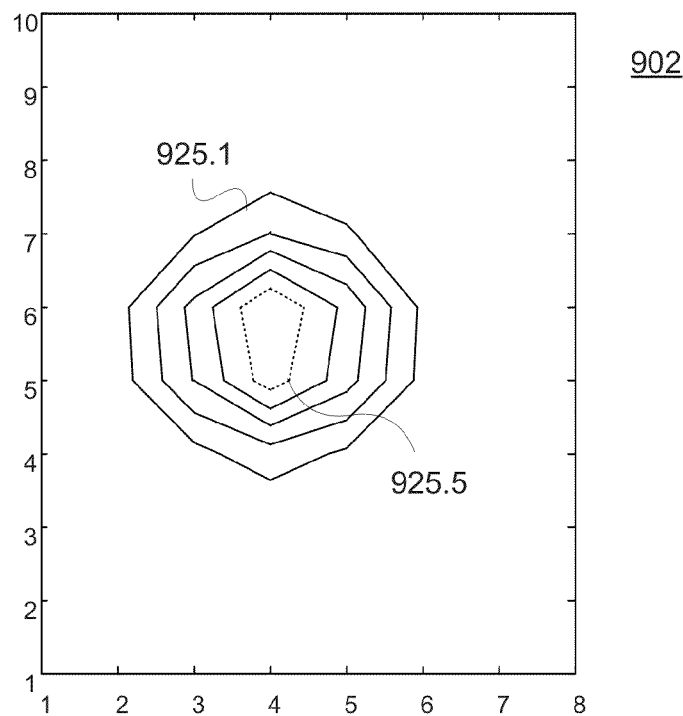
FIG. 9C illustrates an embodiment of polygons derived from a three-dimensional rendering of a contact on an array.
Figure 9D:
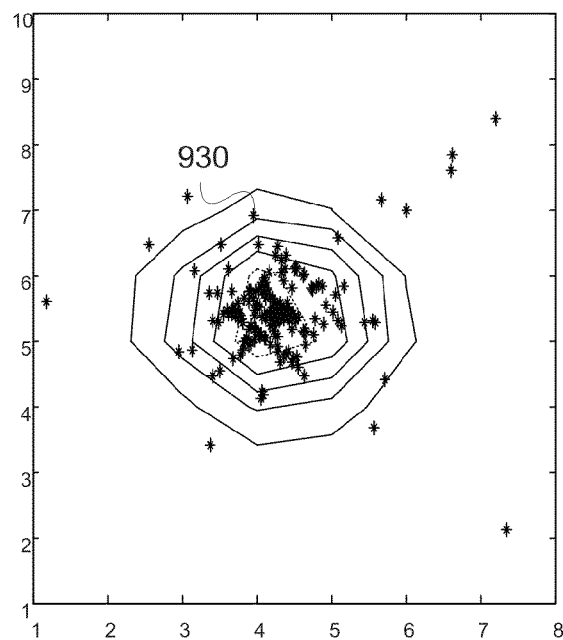
FIG. 9D illustrates an embodiment of the intersections of perpendiculars to line segments of polygons.

FIG. 9C illustrates the output 902 of applying horizons to the three-dimensional rendering of the contact on the array. The embodiment shown in FIG. 9C illustrates five horizons each being ⅙ the total of the highest value. Each horizon is represented by a polygon, 925.1-925.5, that is defined by tracing around the three-dimensional rendering 901. Each polygon 925.1-925.5 is non-overlapping and is defined by an increasing number of line segments as they get further from the center. For each line segment, a perpendicular is calculated. The perpendiculars for each polygon are plotted and their intersections 930 are marked as illustrated in FIG. 9D. The median intersection for both the X and Y directions is indicative of the contact location on the array.

Figure 10:
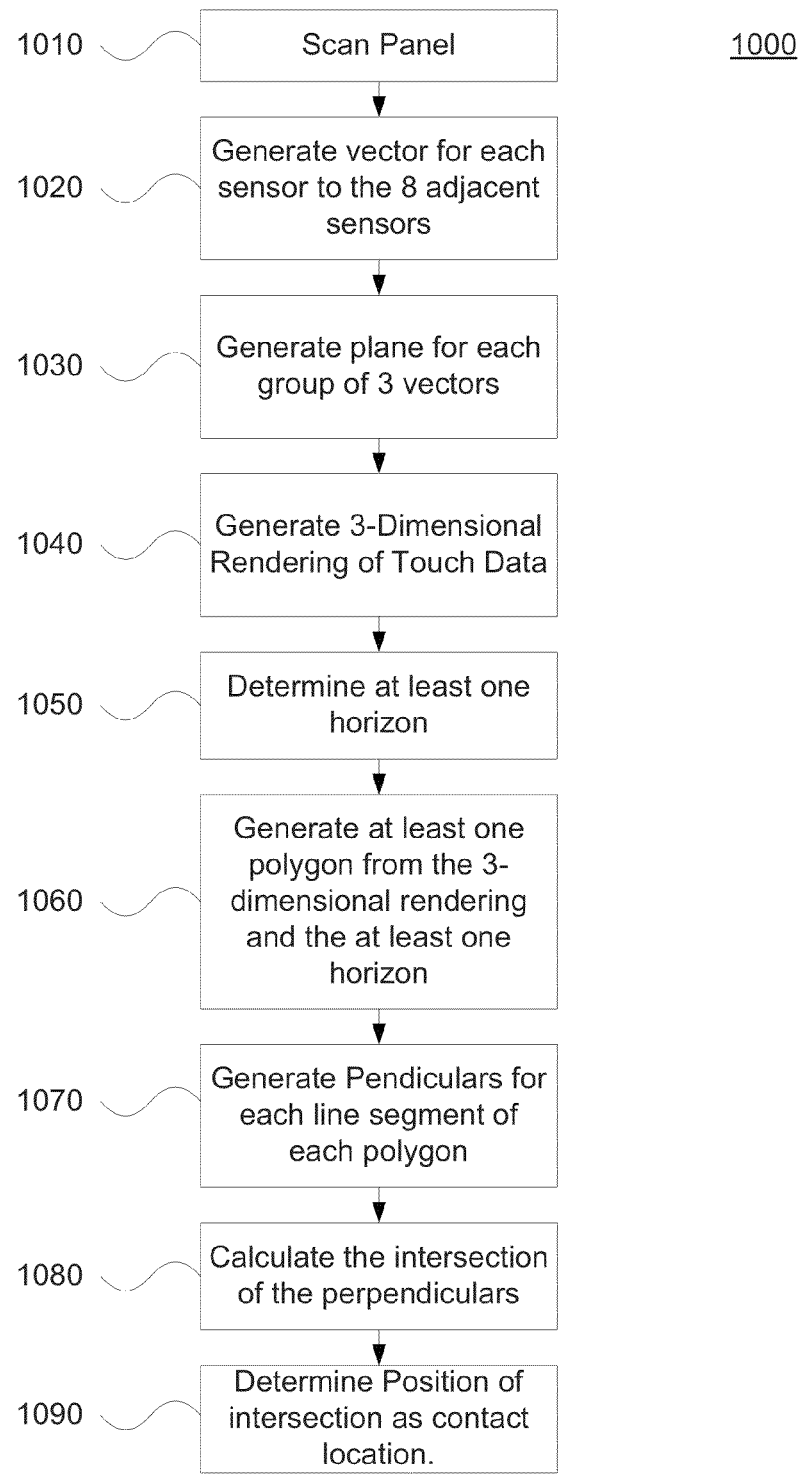
FIG. 10 illustrates an embodiment of a method for using polygons to calculate contact location.

FIG. 10 illustrates one embodiment of the method for determining contact location using the data as shown in FIG. 9A-D. The capacitance panel may be scanned in block 101. The scanning of the panel may be the capacitance sensing circuit shown in FIG. 2. It may also use any other capacitance sensing configuration capable of generating data for each node in an array. Such capacitance sensing configurations may include self-capacitance sensing methods with separate sensors corresponding to each node. In another embodiment, mutual capacitance sensing of intersections of transmit and receive electrodes may be used. In another embodiment, the scanning of the array may be completed through each of the sensors or nodes in turn. In another embodiment, the scanning may be random or pseudorandom through the array of sensors or nodes. In still another embodiment, the scanning may be an incomplete scan of the array of sensors or nodes but representative of the entire array. In another embodiment, the scanning may be an incomplete scan of the array of sensors or nodes but representative of a portion of the array or sensors or nodes. A vector may then be generated for each sensor to the eight sensors that are adjacent to it in block 1020. For each group of three vectors, a plane may be defined in block 1030. Each of the planes from block 1030 may then be used to generate a three-dimensional rendering of the touch data in block 1040. At least one horizon may be determined in block 1050. And at least one polygon may be generated from the application of the horizon determined in block 1050 to the three-dimensional rendering generated in block 1030 in block 1060. Each polygon may be comprised of at least three line segments, the perpendiculars of which may be calculated in block 1070. The intersections of all the perpendiculars for each polygon may be calculated in block 1080 and the intersection that is both the median in the x-direction and the median in the y-direction may be used to determine the contact location on the array in block 1090.

One of the advantages of this method is that no extra processing is required when a contact is near the edge of the array. Touch data is detected for each node, a three-dimensional rendering is generated, and polygons are generated regardless of the contact location. Contact locations near the edge of the array, are taken into account by the capacitive data and the resulting polygons. The intersections of the perpendiculars of each of the line segments of the polygons do not require compensation near the edge of the array.

While the above embodiments have illustrated the use of five horizons to generate five polygons, this is not intended to be limiting. Rather, more or less than five horizons may be used depending on the requirements of the input device, the resolution of the capacitance sensing circuitry, and the required touch resolution of the array. In some situations, less than five horizons may be used. For example, smaller arrays with lower-resolution capacitance sensors may not require the use or have the capability of implementing five horizons. Rather, three horizons may be sufficient or, in fact, ideal. For larger arrays, with more sensitive capacitance sensing circuitry and greater resolution, more horizons may be used to create a higher-resolution scattering of perpendicular intersections. While this may require more processing overhead and memory, larger arrays may not be limited by processing capability.

Large Contact Identification

Large contacts represent unique challenges to a capacitance sensing array. While normal contacts are likely to have clearly defined peak nodes that may be used to determine the nodes included in centroid calculations, larger contacts may have multiple peak nodes or single peak nodes that jitter throughout the touch. In the former, multiple peaks may generate the identification of multiple contacts when only one, larger contact exists. In the latter, the jitter may create position noise, and cause difficulty for a user in interacting with the array. FIG. 11A illustrates an embodiment of a 20×20 array 1100 with three touches, 1101-1103. Touches 1101 and 1102 are standard touches including a single peak node, 1115 and 1125, respectively, and several other active nodes. Touch 1103 is a larger touch which characterized by two peak nodes, either persistent or alternating. Touches 1101 and 1102 are illustrated in FIGS. 11B and 11C. In the embodiments of FIGS. 11B and 11C, 3×3 matrices of nodes 1112 and 1122 are used to calculate the centroid positions, 1111 and 1121. 3×3 matrices 1112 and 1122 are defined by first identifying peak nodes 1115 and 1125 and including the eight surrounding nodes. Centroids 1111 and 1121 for touches 1101 and 1102, respectively, are given by:

$$cx = \Sigma x \cdot S_x$$

$$x = \frac{Res_x}{N_x} \cdot \left[\frac{1}{2} + \frac{C_x}{C_z}\right]$$

$$cy = \Sigma y \cdot S_y$$

$$y = \frac{Res_y}{N_y} \cdot \left[\frac{1}{2} + \frac{C_y}{C_z}\right]$$

$$cx = \Sigma S_z$$

$$z = cz$$

In one embodiment, all sensors inside touch 1103 take part in centroid calculation. In another embodiment, a subset of sensors representative of the array, or representative of a portion of the array may take part in the centroid calculation.

FIG. 11D illustrates an embodiment of a touch 1103 with two persistent peak nodes 1135 and 1136. In the embodiment shown in FIG. 11D, peak nodes 1135 and 1137 of large touch 1103 may be separated by enough space so that two distinct 3×3 matrices 1132 and 1138 may be defined around peak nodes 1135 and 1137, respectively. Two centroids 1131 and 1136 may then be calculated from 3×3 matrices 1132 and 1138, respectively. Touch 1103 is a single touch, not two, so such a calculation would be incorrect.

FIGS. 11E and 11F illustrate an embodiment of touch 1103 if the peak nodes are alternating or intermittent. At one time only a single peak node is detected. The capacitance of the non-detected peak node is still above a threshold, but is not substantially high enough as compared to its surrounding sensors as to be identified as a peak. The peak sensor may move around in this case as the capacitance values change slightly due to natural variation or noise in the measured capacitance values. FIG. 11E illustrates large touch 1103 at a first time when peak node 1135 is used to define 3×3 matrix 1132, from which centroid 1131 is calculated. FIG. D illustrates large touch 1103 at a second time when peak node 1137 is used to define 3×3 matrix 1138, from which centroid 1136 is calculated. This makes touch 1103 appear to be moving across the array when it is not and may cause the processor or touchscreen controller to interpret inputs which were not entered or unintended.

FIG. 11G illustrates an embodiment of touch 1103 with centroid 1141 calculated from all of the active nodes of touch 1103. As stated above, this touch may be calculated by using all of the sensors defined by the limits of touch 1103, 7×6 matrix 1143, or by only the nodes that are active, 1145.

Figure 12:
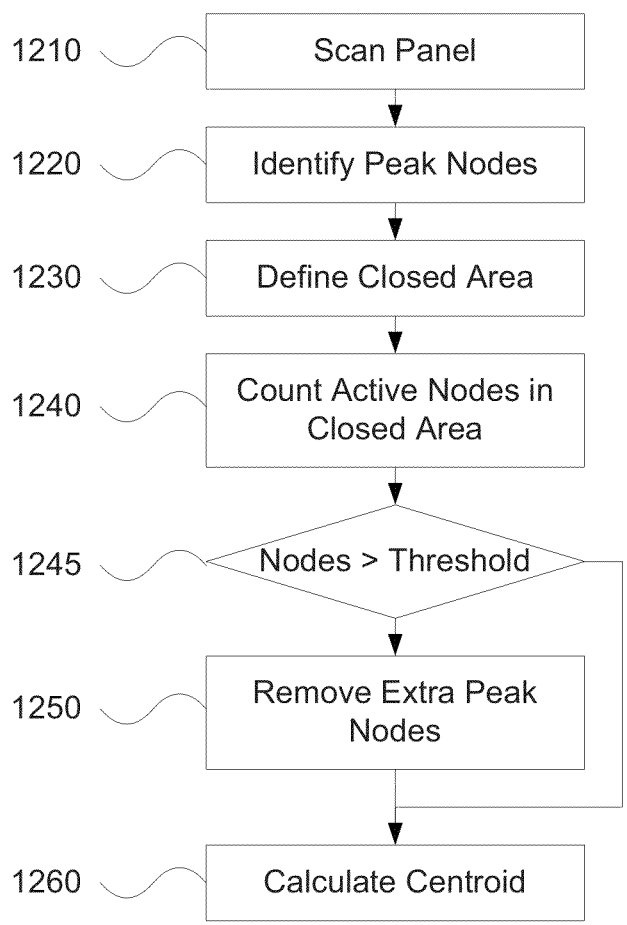
FIG. 12 illustrates an embodiment of a method for calculating the position of a centroid for a large touch.

FIG. 12 illustrates a flowchart for one embodiment of an identification of large touch 1103. In one embodiment, the array is first scanned in block 1210 by capacitance sensor 201 illustrated in FIG. 2. The values of each node are recorded and peak nodes are identified in block 1220. Peak nodes are identified by comparing the stored values for each node with its neighbors. For nodes in the center of the array, there are eight neighboring nodes. For nodes on only one edge, there are five neighboring nodes. For nodes at the corners, there are three neighboring nodes. After peak nodes are identified, a closed area may be defined in block 1230. In one embodiment, the closed area may be defined by establishing a minimum value calculated as some fraction of the value of the peak node. Any node with a value greater than or equal to this minimum value is included in the closed area. The number of nodes in the closed area may be counted and stored in block 1240. In one embodiment, the number of nodes may be stored in a memory such as Flash, RAM, ROM or some other storage medium. In another embodiment, the number of nodes may be send to a host 150 (FIG. 1). The number of nodes in the closed area may then be compared to a threshold number of nodes representative of a touch that is too large to correspond to a standard large finger in decision block 1245. The threshold number may be determined during development based on usability analysis. The threshold number of nodes may also be calculated dynamically based on the use of the device by the user over time. In one embodiment, the user's interaction with the array may be used to increase or decrease the number of sensors such that certain touches that impair the operation of the array are ignored in future use or touches that are not detected but should be are no ignored. If the number of nodes is not greater than a threshold number, the centroid may be calculated using all of the active sensors in the closed area. If the number of active nodes in the closed area is greater than the threshold number, extra peaks may be removed in block 1260 and the centroid calculated in block 1250.

In one embodiment, if the nodes in the closed area is greater than the threshold number, the touch may be ignored altogether. In another embodiment, if the number of nodes in the closed area is greater than the threshold area, the threshold may be increased such that the number of nodes is decreased. In this embodiment, a large touch that is normally too large of the array may not be ignored, but rather its centroid may be calculated from a smaller group of sensors.

Figure 13:
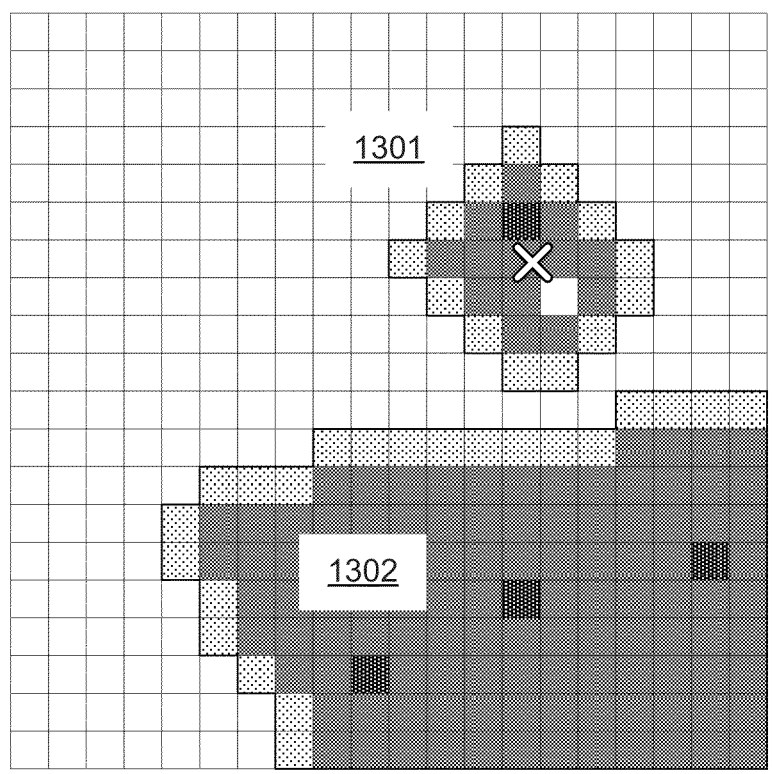
FIG. 13 illustrates an embodiment of an array with a large touch and a very large touch, the very large touch ignored by the processor.
Figure 14:
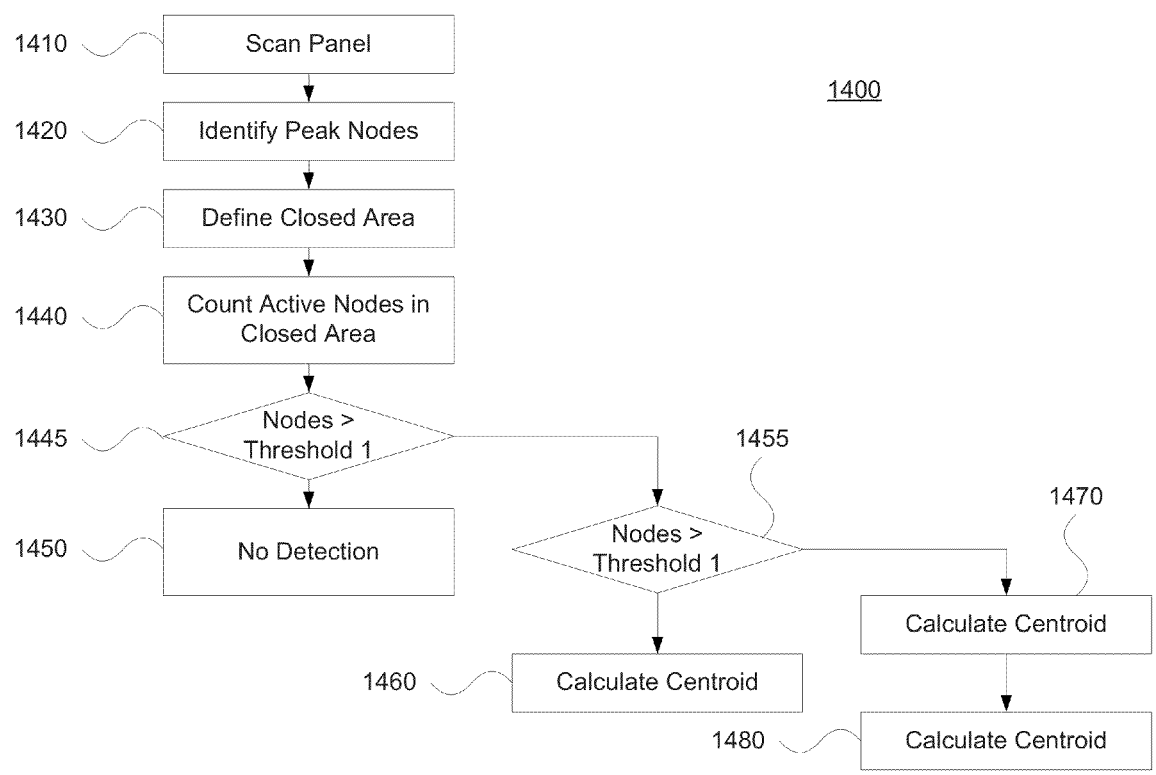
FIG. 14 illustrates embodiment of a method for ignoring very large touches and calculating position of touches for standard and large touches.

For touches that are far too large to be detected as an activation, such as when a palm or face is in contact with the array, it is important that these touches be ignored. FIG. 13 illustrates an embodiment of a 20×20 array 1300 wherein two touches are detected. The first touch 1301 may be a large touch for which the number of active nodes is less than the threshold number. The second touch 1302 may be a large touch for which the number of active nodes is far greater than the threshold number. Touch 1302 may be a user's palm or face. Touch 1301 may be a standard large touch for which the centroid should be calculated according to the method 1200 shown in FIG. 12. To ensure touch 1302 is not detected as a normal touch or a large touch, it may be ignored according to the method 1400 shown in FIG. 14.

The array may first be scanned in block 1410 by capacitance sensor 201 from FIG. 2. The capacitance values may be stored for each node. The capacitance values may then be compared to the capacitance values for each of the neighboring nodes and peak nodes identified in block 1420. A closed area may then be defined for each peak node in block 1430. The closed area may be defined as including all adjacent nodes that have capacitance values greater than or equal to a fraction the capacitance value of the peak node. For each closed area, the active nodes may be counted in block 1440 and compared to a first threshold in decision block 1445. The first threshold may be indicative of a number of nodes that is too great to be a real touch on the array. If the number of nodes in the closed area is greater than the first threshold, no detection may be output in block 1450. If the number of nodes in the closed area is less than the first threshold, the number may then be compared to a second threshold in decision block 1455. The second threshold may be indicative of a large touch as shown in FIG. 11 (touch 1103). If the number of nodes in the closed area is greater than the second threshold, the centroid for the entire closed area (all of the nodes) may be calculated in block 1460. If the number of nodes in the closed area is not greater than the second threshold, the peak node may be used to define a matrix of sensors around the peak node in block 1470. The matrix may be a 3×3 matrix in one embodiment. In another embodiment, the matrix may be a 5×5 matrix or some other number of nodes. One of ordinary skill in the art would understand that the number of sensors in the matrix defined by the peak node is dependent on the application requirements, the processing capabilities of the sensing and processing circuits, and the physical construction of the array. After a matrix is defined in block 1470, the centroid for the peak node may be calculated in block 1480.

Contact Tracking

When multiple contacts are present on the array, it is important to identify each contact and maintain that identification as one or more of them moves while maintaining contact with the array. Several methods may be used for tracking contacts including least squares, probability, and velocity/acceleration calculation. One embodiment for tracking contacts may use the Hungarian Algorithm. The Hungarian Algorithm is combinatorial optimization algorithm which solves the assignment problem in polynomial time. A combinatorial optimization algorithm seeks to minimize or maximize a real function by systematically choosing the values of real or integer variables from within an allowed set. In the area of capacitance sensing on multitouch arrays, the assignment problem is which identification to assign to each touch between time t0 and time t1.

Figure 15:
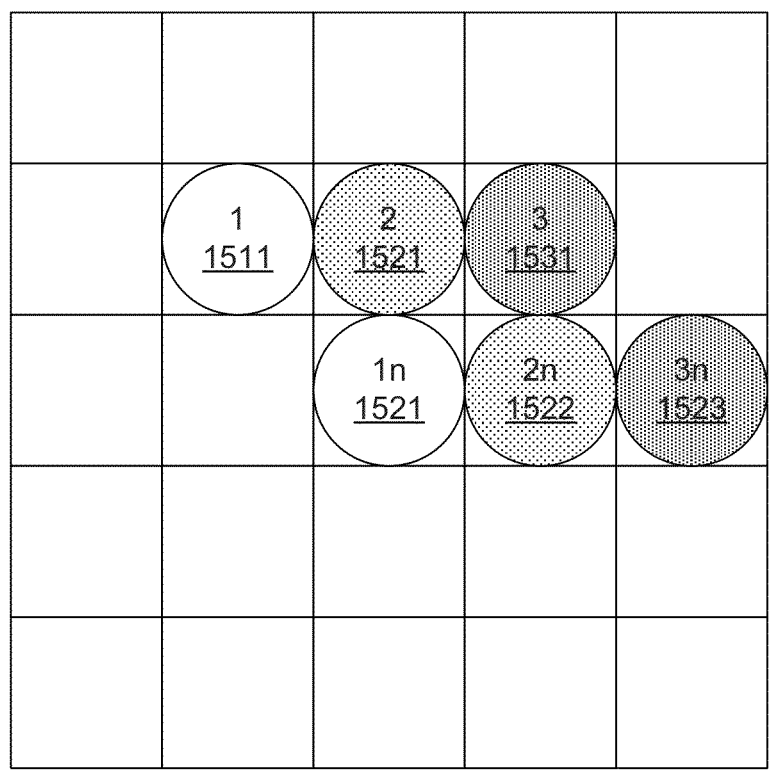
FIG. 15 illustrates an embodiment of an array of touches with three contacts at two times.

FIG. 15 illustrates a 5×5 array 1500 on which three touches 1511, 1521 and 1531 have been detected at time t0. Three touches 1512, 1522 and 1532 are detected on the array 1500 at time t1. The goal of the Hungarian Algorithm is to determine which touches at time t1 correspond to which touches at time t0.

First the square of the distances between each touch at time t1 and each touch at time t0 is calculated as:

$$1 \rightarrow 1n: (3-2)^2 = 1^2 = 1$$

$$1 \rightarrow 2n: (4-2)^2 = 2^2 = 4$$

$$1 \rightarrow 3n: (5-2)^2 = 3^2 = 9$$

$$2 \rightarrow 1n: (3-3)^2 = 0^2 = 0$$

$$2 \rightarrow 2n: (4-3)^2 = 1^2 = 1$$

$$2 \rightarrow 3n: (5-3)^2 = 2^2 = 4$$

$$3 \rightarrow 1n: (3-4)^2 = 1^2 = 1$$

$$3 \rightarrow 2n: (4-4)^2 = 0^2 = 1$$

$$3 \rightarrow 3n: (5-4)^2 = 1^2 = 1$$

A matrix of the squares of distances between touches at time t1 and t0 is then constructed according to FIG. 16A. The lowest number for each column is subtracted from the other cells in each column, generating non-negative cells in the matrix with at least one zero per column, according to FIG. 16B. An zero cell in the first column is marked. If there is a zero in the second column in a row where there is not already a marked cell, that cell is also marked. The third column is then analyzed. In the data shown in FIG. 16C, the zero cell in the third column shares a row with a previously marked cell in the second column, so it is not marked. If the number of zero cells with a mark is equal to the number of touches, than the process is finished. However, in the example shown here, there are only two marked cells at this point so the analysis must continue. Also shown in FIG. 16C, each of the columns with marked cells is marked with a "+". If there are zero elements in the unmarked column as shown in FIG. 16C, there are two possible situations: the row contains an unmarked zero and a marked zero or the row contains no marked zero. If the latter is true, the zero cell is marked with a second mark. If the former is true, mark the row that has both the marked and unmarked zero cell and mark the unmarked zero cell with a second mark as shown in FIG. 16D. As shown in FIG. 16E, cells that do not have a marked row or a marked column are identified (bold, solid line) and cells that have both a marked row and a marked column are identified (bold, dashed line). The cell from the former with the lowest value is subtracted from all of the cells in the former and added to all the cells in the latter, resulting in the matrix shown in FIG. 16F. The procedure illustrated by the matrices shown in FIGS. 16E and 16F is repeated until the number of zeros with the second mark is equal to the number of touches, N, as shown in FIGS. 16G-J, with 16J being the final resulting matrix. Each zero is then marked (shaded cells), shown in FIG. 16K, and the zeros with the first mark and the second mark are swapped so that each zero cell that had a first mark now has a second mark and vice versa, as shown in FIG. 16L. The cells marked with the first mark in FIG. 16L show which of the touches at time t1 correspond to which touches at time t0. For this analysis, 1 corresponds to 1n, 2 corresponds to 2n, and 3 corresponds to 3n.

While the example of the Hungarian algorithm shown above is used to track three touches between time t0 and t1, it would be clear to one of ordinary skill in the art that as few as two touches may be tracked using the Hungarian algorithm. The upper limit on the number of touches that may be tracked is limited only by the processing capability of the processor. In a standard touchscreen these touches may number as many as ten, corresponding to each finger on two hands. However, more than ten touches may be implemented as well, using a much larger matrix.

While touch locations are tracked only with regard to a single dimension, x, is shown in the above example, it would be clear to one of ordinary skill in the art to use the Hungarian algorithm to track touch locations along the y axis as well. Furthermore, in applications capable of detecting z-axis location, such as proximity sensing capacitance sensing, field effect sensing, and optical scanning applications, a third axis may also be processed.

Interpolation Using Gaussian Curves

In a self-capacitance sensing system similar to that shown in FIG. 1, the response of the sensors to conductive object moving across the array has a more Gaussian response. That is, the interaction between the conductive object and the sensor has a peak value as the object is directly over the sensor and tapers as the object moves away until there is virtually no interaction between the object and the sensor.

Figure 17B:
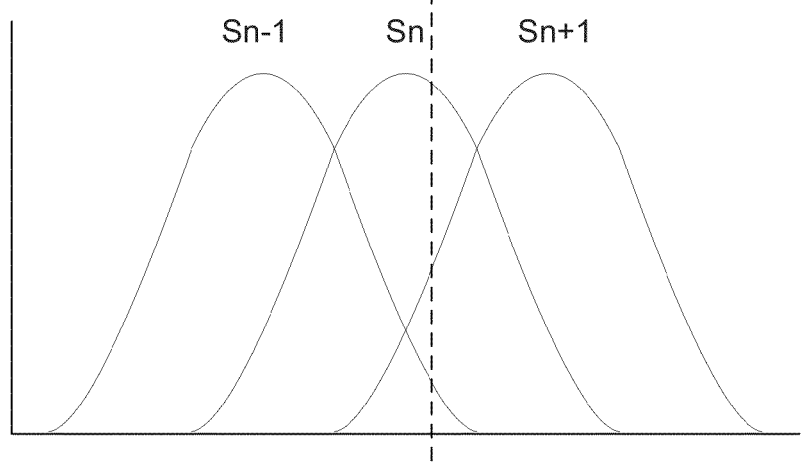
Figure 18A:
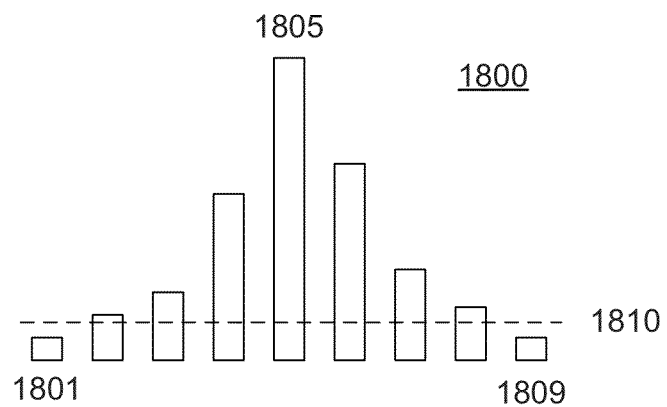
FIG. 18A-F illustrate an embodiment of dynamic noise thresholds.

FIG. 18A illustrates a system 1700 with a conductive object 1701 interacting with three sensors 1710, 1711, and 1712. The response of each sensor 1710-1712 to conductive object 1701 is shown in FIG. 17B. Each sensor has a Gaussian response to the conductive object as it moves from right to left or left to right. In system 1700, the conductive object is capable in interacting with all three sensors at one time such that the measured capacitance change on each sensor is used to calculate the position. In a system, there are likely more than three sensors. To determine which sensors are to be used for the Gaussian interpolation, the sensors are all scanned and peak sensor is identified. The sensors to the left and right (or above and below if along the y-axis) are then used in the interpolation. The Gaussian curve for each sensor in the x-dimension used in the Gaussian interpolation is given by:

$$S_{n-1} = e^{a1 - a2(x+d)^2}$$

$$S_n = e^{a1 - a2(x)^2}$$

$$S_{n+1} = e^{a1 - a2(x-d)^2}$$

where S is the capacitance change detected on each sensor, d is the pitch of each sensor in pixels and a1 and a2 are approximation constants (which cancel in the final derivation). The coordinates of the touch position along the x-axis is given by:

$$x = \frac{d}{2} \cdot \frac{\ln S_{n+1} - \ln S_{n-1}}{2 \cdot \ln S_n - \ln S_{n+1} - \ln S_{n-1}}.$$

In one embodiment, the natural logarithm function may be calculated by the processor. This may require more processing capability than is available in many touchscreen controllers. In another embodiment, the natural logarithm function may be implemented as a look-up vector.

Figure 17A:
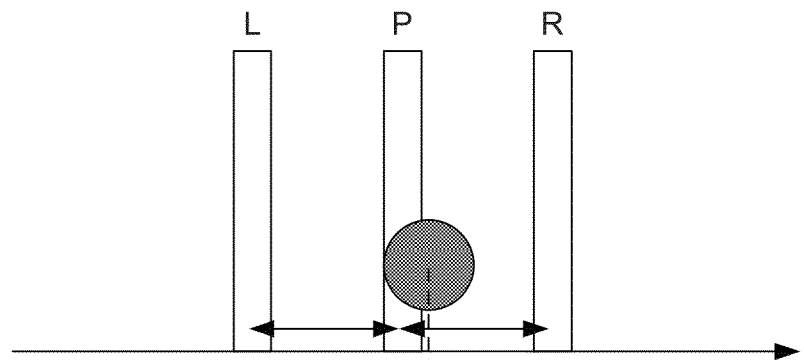
FIGS. 17A and 17B illustrates an embodiment of Gaussian curve interpolation for position calculation.

While the embodiment shown in FIG. 17 illustrates the use of three sensors in the Gaussian curve interpolation, it would be clear to one of ordinary skill in the art that more than three sensors might be used. In one embodiment, five sensors may be used. The decision to use more or fewer sensors in the Gaussian curve interpolation is based on the sensor pitch, the anticipated size of the conductive object, the resolution of the capacitance sensing circuit and the required output resolution of the capacitance sensing array.

Dynamic Threshold Determination

Figure 18B:
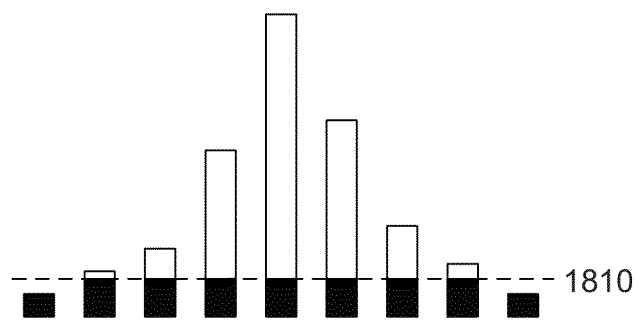
Figure 18C:
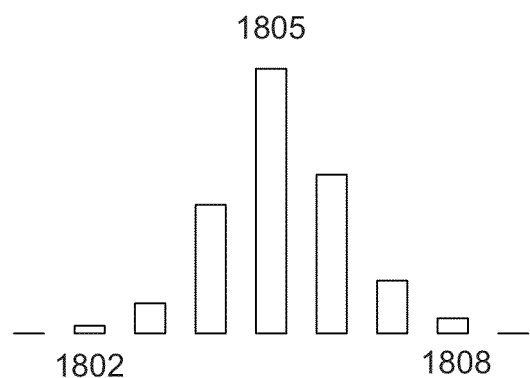

In self- and mutual-capacitance sensing array a baseline value is subtracted from the measured capacitances of each sensor to create a compensated value. This compensated value is used to interpolate the position of a conductive object on the capacitance sensing array. FIG. 18A illustrates an array 1800 of nine sensors 1801-1809. Each sensor has a non-zero capacitance value, with the peak sensor identified as 1805. A threshold 1810 may be applied to the sensors and the capacitance values below threshold 1810 subtracted from capacitance values for sensors 1801-1809. This is shown in FIG. 18B, wherein the shaded portions of sensors 1801-1809 are subtracted from the capacitance values to yield the values illustrated in FIG. 18C. In FIG. 18C, there are seven sensors 1802-1808 that have a capacitance value above the threshold 1810. Only a subset of these sensors may be used to calculate the position of the object on the array, the capacitance values near the ends of the distribution are wasted both on those sensors and on the sensor that are used in the position calculation.

Figure 18D:
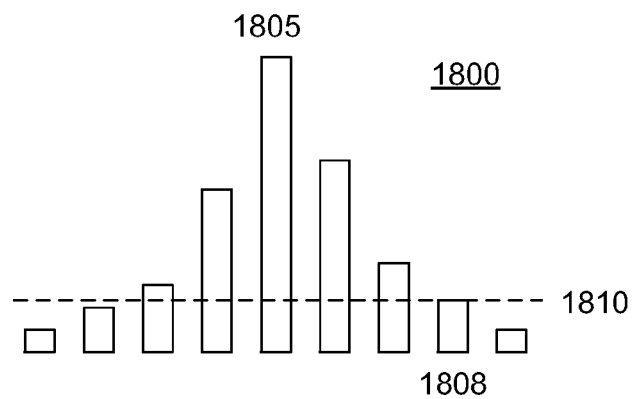
Figure 18E:
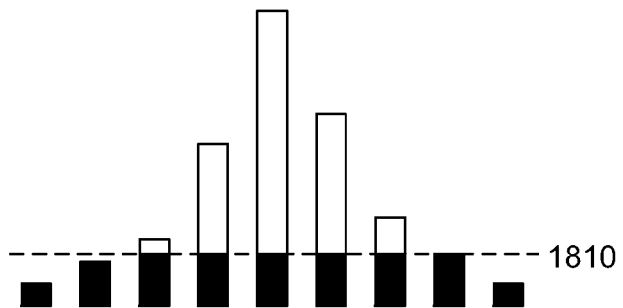
Figure 18F:
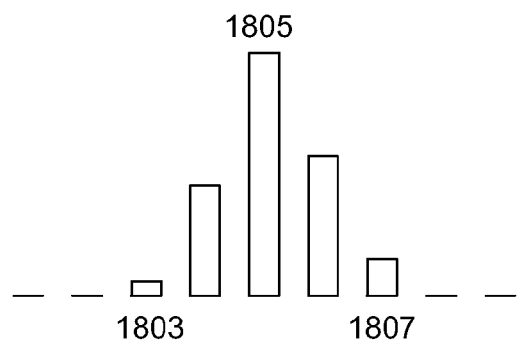

FIG. 18D illustrates the same capacitance values 1801-1809 but with the threshold 1810 defined by the maximum capacitance value past a threshold of sensors away from peak sensor 1805. In the embodiment shown in FIG. 18D, five sensors are used in the calculation of position of the object, so the greatest value on any sensor outside the five sensors 1803-1807 is subtracted from all the sensors. In the embodiment shown in FIG. 18D, sensor 1808 has the next highest capacitance value. It is the value of sensor 1808 which is subtracted from all the sensors, as shown by the shaded areas of FIG. 18E. The result is shown in FIG. 18F, wherein only the sensors with capacitance values above that of sensor 1808 now have non-zero values and those sensors are using only the capacitance above the threshold to calculate position. The centroid for sensors in the x-dimension is given by:

$$x = \frac{\text{Resolution}}{N} \cdot \left( i + \frac{1}{2} + \frac{S_{i+1} - S_{i-1}}{S_{i-1} + S_i + S_{i+1}} \right).$$

where is the desired resolution of the interpolation, N is the number of sensor in the array for the dimension in question, and i is the index of the peak sensor.

While the embodiment shown in FIG. 18 shows five sensor used in the calculation of the centroid, it would be clear to one or ordinary skill in the art to use more or less than five sensor depending on the design requirements. The above equation uses only three sensors, but could be expanded to five or more sensors in one embodiment if required by the application.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

The invention claimed is:

1. A capacitance sensing apparatus comprising:
a first plurality of electrodes disposed along a first axis;
a second plurality of electrodes disposed along a second axis;
a capacitance sensing circuit coupled to the first and second pluralities of electrodes and configured to measure a plurality of capacitances representative of a conductive object proximate to the first and second pluralities of electrodes; and
a processor coupled to the capacitance sensing circuit and configured to calculate a position of at least one contact on the first and second pluralities of electrodes based on the measured capacitances, the processor configured to calculate a position based on at least one virtual node, wherein the at least one virtual node is generated to complete an N×M matrix of nodes and is populated by mirroring capacitance data from a real node along a meridian, the meridian on at least one axis centered on the peak intersection.

2. The capacitance sensing apparatus of claim 1 wherein the first and second pluralities of electrodes comprise a plurality of diamond-shaped pads coupled together in a chain, and where in the first and second pluralities of electrodes substantially fill a sensing area.

3. The capacitance sensing apparatus of claim 1, wherein:
the first plurality of electrodes is disposed on a first layer and configured to substantially fill a sensing area; and
the second plurality of electrodes is disposed on a second layer and configured not to substantially fill the sensing area such that the first plurality of electrodes is visible in the spaces between the second plurality of electrodes.

4. The capacitance apparatus of claim 3 wherein each of the second plurality of electrodes comprises a plurality of traces coupled together at at least one end such that the traces are electrically equivalent.

5. The capacitance sensing apparatus of claim 1 wherein the processor is configured to define a N×M matrix of intersections in an array of values representative of measured capacitances, the center of the N×M matrix defined substantially by an intersection at which a peak capacitance value is detected.

6. The capacitance sensing apparatus of claim 5 wherein the virtual electrodes complete the N×M matrix when the peak capacitance value is detected at a node at which the N×M matrix extends beyond the array.

7. The capacitance sensing apparatus of claim 1 wherein the processor is configure to use a first plurality of intersections in a first direction from the peak capacitance value and a second plurality of intersections in a second direction from the peak capacitance value.

8. The capacitance sensing apparatus of claim 7 wherein the virtual nodes complete the first and second pluralities of intersections when the peak capacitance value is detect at an intersection too close to the edge of the array for a complete N×M matrix to be defined.

9. The capacitance sensing apparatus of claim 1, wherein the real nodes are used twice in the position calculation based on the virtual nodes necessary to complete the N×M matrix.

10. The capacitance sensing apparatus of claim 1 wherein the nodes are individual capacitance sensors each coupled to a different input of the capacitance sensing circuit.

11. A system comprising:
a capacitance sensing array comprising:
a first plurality of electrodes disposed along a first axis;
a second plurality of electrodes disposed along a second axis;
a capacitance sensing circuit coupled to the first and second pluralities of electrodes and configured to measure a plurality of capacitances formed at the intersections of the first and second pluralities of electrodes; and
a processor coupled to the capacitance sensing circuit and configured to calculate a position of at least one contact on the first and second pluralities of electrodes based on the measured capacitances, the processor configured to generate virtual values for intersections to complete an N×M matrix of intersections that are not present on the array but necessary for the calculation of the position of the at least one contact, wherein the virtual values for intersections that are not present on the array are populated by mirroring real values for intersections that are present on the array along a meridian defined on at least one axis centered on a peak intersection.

12. The capacitance sensing apparatus of claim 11 wherein the first and second pluralities of electrodes comprise a plurality of diamond-shaped pads coupled together in a chain, and where in the first and second pluralities of electrodes substantially fill a sensing area.

13. The capacitance sensing apparatus of claim 11, wherein:
the first plurality of electrodes is disposed on a first layer and configured to substantially fill a sensing area; and
the second plurality of electrodes is disposed on second layer and configured to not substantially fill the sensing area such that the first plurality of electrodes is visible in the spaces between the second plurality of electrodes.

14. The capacitance sensing apparatus of claim 11 wherein the processor is configured to define a N×M matrix of intersections in an array of values representative of measured capacitances, the center of the N×M matrix defined substantially by an intersection at which a peak capacitance value is detected.

15. The capacitance sensing apparatus of claim 14 wherein the virtual electrodes complete the N×M matrix when the peak capacitance value is detected at a node at which the N×M matrix extends beyond the array.

16. A method for determining position of a capacitance sensing array comprising:
scanning the capacitance sensing array, the capacitance sensing array comprising a first plurality of electrodes disposed along a first axis and a second plurality of electrodes disposed along a second axis;
building an array of values corresponding to intersections of the first and second pluralities of electrodes;
identifying at least one peak intersection, wherein the peak intersection is characterized by a greater measured capacitance than any of the surrounding intersections;
determining if the peak intersection is in a location when a complete N×M matrix may be generated about the peak intersection;
if an N×M matrix may be generated, generating the N×M matrix and calculating the position of the at least one contact on the array; and
if an N×M matrix may not be generated,
defining a meridian on at least one axis centered on the peak intersection;
generating dummy intersections to complete the N×M matrix;
populating the dummy intersections by mirroring capacitance values about the meridian; and
calculating the position of the at least one contact on the array.

17. The method of claim 16 wherein the N×M matrix include the sensors on a first axis and a second axis, wherein the first and second axis are centered on the peak intersection.

18. The method of claim 16, wherein the scanning the capacitance sensing array comprises measured a mutual capacitance between each of the first and each of the second pluralities of electrodes.

19. The method of claim 16, wherein N and M are equal to the same number.

20. The method of claim 16, wherein scanning of the array comprises measuring capacitance at each intersection in turn.

21. The method of claim 16, wherein scanning the array comprises measuring capacitance at each intersection non-sequentially.

22. The method of claim 16, wherein scanning the array comprises measuring capacitance at a plurality of intersections representative of the entire array.

23. The method of claim 22, wherein the plurality of intersections representative of the entire array is less than the all the intersections of the array.

* * * * *